(12) United States Patent
Waki et al.

(10) Patent No.: US 10,666,955 B2
(45) Date of Patent: May 26, 2020

(54) STILL IMAGE GENERATING APPARATUS AND INFORMATION RECORDING MEDIUM USED IN STILL IMAGE GENERATING APPARATUS

(71) Applicant: Panasonic Intellectual Property Management Co., Ltd., Osaka (JP)

(72) Inventors: Hirohisa Waki, Osaka (JP); Hideki Taniguchi, Kyoto (JP); Hironori Nakano, Osaka (JP)

(73) Assignee: Panasonic Intellectual Property Management, Co., Ltd., Osaka (JP)

( * ) Notice: Subject to any disclaimer, the term of this patent is extended or adjusted under 35 U.S.C. 154(b) by 0 days.

(21) Appl. No.: 15/823,957

(22) Filed: Nov. 28, 2017

(65) Prior Publication Data

US 2018/0242005 A1 Aug. 23, 2018

(30) Foreign Application Priority Data

Feb. 23, 2017 (JP) .................................. 2017-032531
Aug. 23, 2017 (JP) .................................. 2017-160235

(51) Int. Cl.
*H04N 19/177* (2014.01)
*H04N 19/503* (2014.01)
(Continued)

(52) U.S. Cl.
CPC ......... *H04N 19/177* (2014.11); *H04N 1/0044* (2013.01); *H04N 1/00148* (2013.01);
(Continued)

(58) Field of Classification Search
CPC ......... H04N 19/177; H04N 2201/0084; H04N 2201/0096
See application file for complete search history.

(56) References Cited

U.S. PATENT DOCUMENTS

| 5,699,458 A * | 12/1997 | Sprague | ................. H04N 19/30 375/240.18 |
| 2007/0201839 A1* | 8/2007 | Murakami | ........... G11B 27/105 386/333 |

(Continued)

FOREIGN PATENT DOCUMENTS

| JP | 2005-057634 | 3/2005 |
| JP | 2005-184240 | 7/2005 |

(Continued)

*Primary Examiner* — Mishawn N. Hunter
(74) *Attorney, Agent, or Firm* — Renner, Otto, Boisselle & Sklar, LLP

(57) ABSTRACT

The present disclosure relates to a still image generating apparatus that generates still image data from moving image data that generates a moving image, and includes a recorder and a control unit. The recorder is configured to record the still image data. When a specific frame image is selected from a plurality of frame images included in the moving image, the control unit sets a specific frame image group including the specific frame image and other frame images having a reference relationship with the specific frame image. The control unit generates the still image data corresponding to each of the plurality of frame images included in the specific frame image group by decoding the moving image data. The control unit causes the recorder to record the generated still image data. The control unit generates frame image data that generates at least one of the plurality of frame images included in the specific frame image group based on the still image data recorded by the recorder.

11 Claims, 14 Drawing Sheets

(51) Int. Cl.
  H04N 1/21  (2006.01)
  H04N 1/00  (2006.01)
  H04N 19/44   (2014.01)

(52) U.S. Cl.
  CPC ......... H04N 1/00461 (2013.01); H04N 1/212 (2013.01); H04N 19/503 (2014.11); *H04N 19/44* (2014.11); *H04N 2201/0084* (2013.01); *H04N 2201/0096* (2013.01)

(56)  References Cited

U.S. PATENT DOCUMENTS

| | | | | |
|---|---|---|---|---|
| 2007/0285573 | A1* | 12/2007 | Ichikawa | G11B 27/034 348/571 |
| 2008/0240503 | A1* | 10/2008 | Okada | G06K 9/00228 382/103 |
| 2009/0080020 | A1* | 3/2009 | Kitagawa | H04N 5/85 358/1.15 |
| 2012/0038829 | A1* | 2/2012 | Mitani | H04N 13/324 348/649 |
| 2013/0287118 | A1* | 10/2013 | Koyama | H04N 19/00 375/240.24 |
| 2014/0153889 | A1* | 6/2014 | Murphy | G02B 6/44 385/134 |
| 2015/0381893 | A1* | 12/2015 | Miyasako | H04N 5/23254 348/208.6 |
| 2016/0344933 | A1 | 11/2016 | Mukai et al. | |
| 2017/0185279 | A1* | 6/2017 | Hiraishi | G06F 3/0482 |

FOREIGN PATENT DOCUMENTS

| | | |
|---|---|---|
| JP | 2011-166594 | 8/2011 |
| JP | 2016-032214 | 3/2016 |

\* cited by examiner

STILL IMAGE GENERATING APPARATUS AND INFORMATION RECORDING MEDIUM USED IN STILL IMAGE GENERATING APPARATUS

BACKGROUND

1. Technical Field

The present disclosure relates to a still image generating apparatus and an information recording medium used in the still image generating apparatus.

2. Description of the Related Art

JP 2005-184240 A (PTL 1) discloses an image processing apparatus that allows a user to select a desired image from a moving image during playback.

This image processing apparatus includes an input unit that inputs instructions concerning moving image display, an expansion control unit that generates frame image data by expanding image compression data, and a display control unit that performs moving image display based on the generated frame image data. Upon receiving a stop instruction from the input unit, the display control unit displays a plurality of images (frame images) based on a plurality of frame image data including the frame image data of images during display. This allows the user to easily select a desired image from a moving image during playback.

JP 2016-032214 A (PTL 2) discloses a technique of capturing a moving image under image capturing conditions suitable for still images, assuming that still images are extracted from a recorded moving image after the moving image is captured.

SUMMARY

A first aspect of the present disclosure relates to a still image generating apparatus that generates still image data from moving image data that generates a moving image. The sill image generating apparatus includes a recorder and a control unit. The recorder is configured to record the still image data. When a specific frame image is selected from a plurality of frame images included in the moving image, the control unit sets a specific frame image group including the specific frame image and other frame images having a reference relationship with the specific frame image of the plurality of frame images. The control unit generates the still image data respectively corresponding to the plurality of frame images included in the specific frame image group by decoding the moving image data. The control unit causes the recorder to record the generated still image data. The control unit generates frame image data that generates at least one of the plurality of frame images included in the specific frame image group based on the still image data recorded by the recorder.

A second aspect of the present disclosure relates to an information recording medium that records a program for causing a still image generating apparatus to generate still image data from moving image data that generates a moving image. The program causes the control unit of the still image generating apparatus to generate the still image data corresponding to a specific frame image group including a selected specific frame image and another frame image having a reference relationship with the specific frame image, by decoding the moving image data. The moving image includes a plurality of frame images. The plurality of the frame images includes the specific frame image and said another frame image. The program causes the control unit to control the recorder of the still image generating apparatus to record the generated still image data. The program causes the control unit to generate frame image data that generates at least one of the plurality of frame images included in the specific frame image group based on the recorded still image data.

According to the present disclosure, when a specific frame image is selected, still image data of another frame image having a reference relationship with the specific frame image is also generated and recorded in advance. When, therefore, a display unit displays a plurality of frame images at once or while switching between the frame images, it is possible to shorten a processing time required to display frame images, thereby improving user's convenience.

DETAILED DESCRIPTION

Hereinafter, exemplary embodiments will be described in detail with reference to the drawings as appropriate. It is noted that a more detailed description than need may be omitted. For example, the detailed description of already well-known matters and the overlap description of substantially identical configurations may be omitted. This is to avoid an unnecessarily redundant description below and to facilitate understanding of those skilled in the art.

The attached drawings and the following description are provided for those skilled in the art to fully understand the present disclosure, and are not intended to limit the subject matter as described in the appended claims.

First Exemplary Embodiment

An information processing apparatus as an exemplary embodiment of a still image generating apparatus according to the present disclosure will be described below with reference to the attached drawings.

[1-1. Arrangement]

Figure 1:
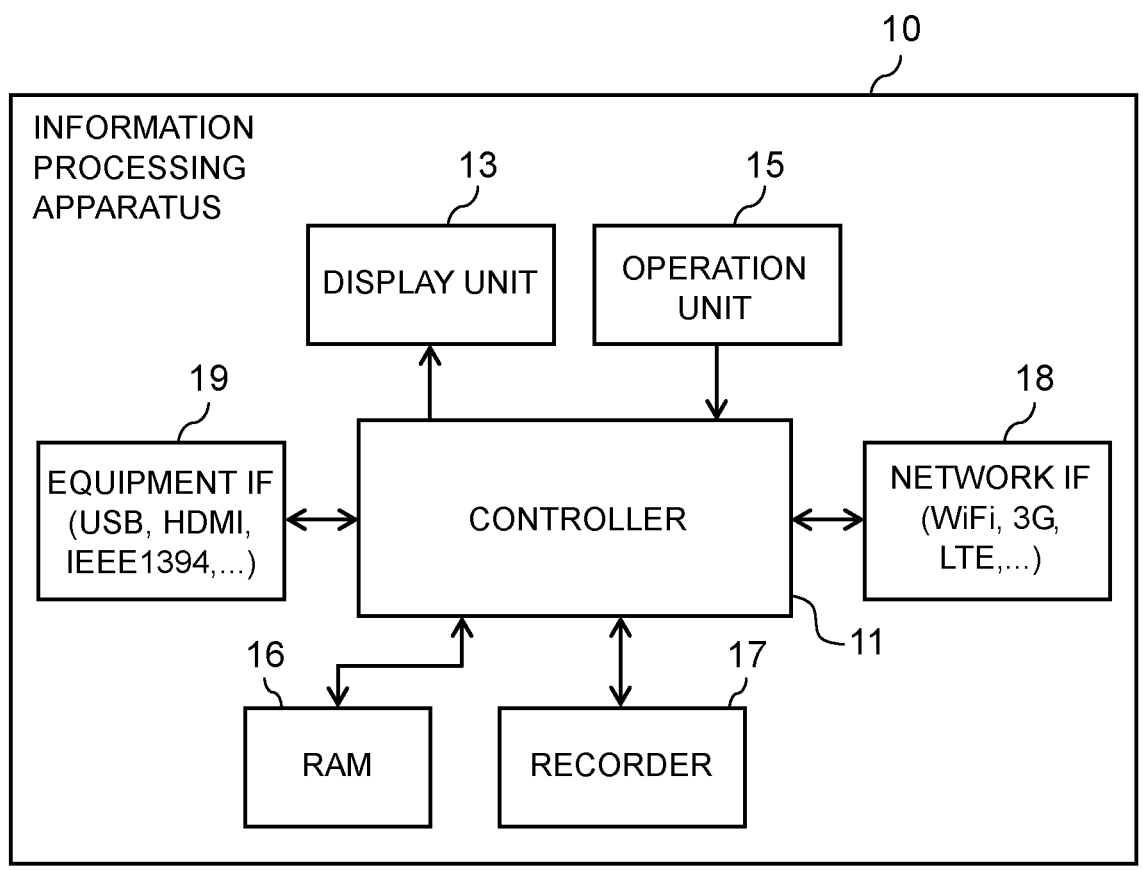
FIG. 1 is a diagram showing an arrangement of an information processing apparatus according to an exemplary embodiment.

FIG. 1 is a diagram showing an arrangement of information processing apparatus 10 according to this exemplary embodiment. Information processing apparatus 10 is equipment capable of processing data, such as a personal computer. Information processing apparatus 10 includes controller 11 that controls an overall operation of the apparatus, display unit 13 that displays various types of information, operation unit 15 with which a user performs an operation, random access memory (RAM) 16, and recorder 17 that records data and programs. In addition, information processing apparatus 10 includes network interface 18 for connection to a network and equipment interface 19 for connection to external equipment.

Display unit 13 is implemented by, for example, a liquid crystal display or an organic electro luminescence (EL) display. Operation unit 15 includes at least one of a keyboard, a mouse, a touch pad, a touch panel, and the like. Operation unit 15 may further include buttons physically provided on information processing apparatus 10. In addition, operation unit 15 may include buttons virtually displayed on display unit 13.

Network interface 18 is a circuit (module) for connection to a network. Network interface 18 performs communication based on a communication standard such as 3G, 4G, long term evolution (LTE), IEEE802, or Wi-Fi (registered trademark). Equipment interface 19 is a circuit (module) for communicating with external equipment. Equipment interface 19 performs communication based on a communication standard such as USB (registered trademark), HDMI (registered trademark), IEEE1394, or Bluetooth (registered trademark).

Recorder 17 is a recording medium that records parameters, data, control programs, and the like for implementing predetermined functions of information processing apparatus 10. Recorder 17 is implemented by, for example, a hard disk (HDD), solid state drive (SSD), or optical disk drive. In this exemplary embodiment, recorder 17 stores a moving image generation application for generating moving image data and a still image generation application (control program) for generating still images from moving images. The moving image generation application and the still image generation application (control program) may be installed from a portable recording medium such as an optical disk or memory card into information processing apparatus 10, may be installed from another equipment connected via equipment interface 19, or may be downloaded from a server via a network.

Controller 11 includes a central processing unit (CPU) or micro processing unit (MPU). Controller 11 implements a function described below by executing the still image generation application (control program). Note that controller 11 may be implemented by only a hardware circuit exclusively designed to implement predetermined functions. That is, controller 11 can include various types of circuits such as a digital signal processor (DSP), a field-programmable gate array (FPGA), and an application specific integrated circuit (ASIC) as well as a CPU and an MPU.

[1-2. Operation]

An operation of information processing apparatus 10 having the above arrangement will be described below.

Information processing apparatus 10 has a function for generating still image data from moving image data. More specifically, information processing apparatus 10 specifies one frame image (a specific frame image in the present disclosure) from a plurality of frame images constituting a moving image. Information processing apparatus 10 then generates still image data by compressing the specified frame image in a standardized format. The standardized format is, for example, a JPEG format, Bitmap format, or TIFF format.

In this exemplary embodiment, moving image data includes specific moving image data such as that disclosed in JP 2016-032214 A, in addition to general moving image data. This specific moving image data is moving image data generated on the assumption that a user extracts a desired frame image from recorded moving image data. This specific moving image data is moving image data generated by capturing under image capturing conditions suitable for still images, compared to general moving image data.

Figure 2:
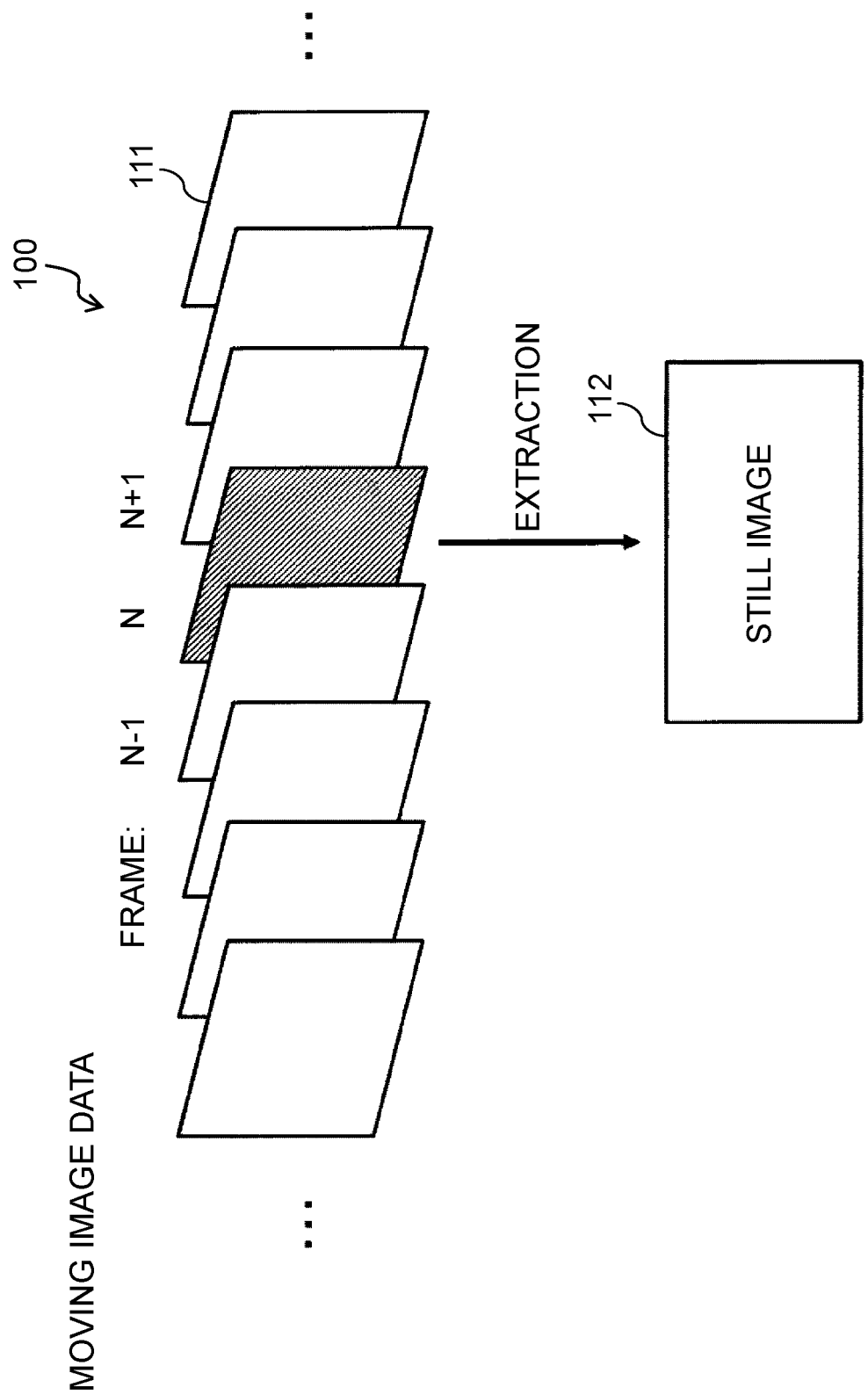
FIG. 2 is a view for explaining extraction of a still image from a plurality of frame images constituting moving image data.

In addition, moving image data according to this exemplary embodiment is moving image data that is coded in conformity with the H.265 (ISO/IEC23008-2 HEVC) coding scheme. For example, as shown in FIG. 2, moving image 100 is constituted by a plurality of frame images 111. Information processing apparatus 10 generates still image data 112 by extracting one frame image (an Nth frame image in FIG. 2) from the plurality of frame images 111 in accordance with a user's instruction. This function is implemented when controller 11 executes a still image generation application (control program).

[1-2-1. Operation Screen]

Figure 3:
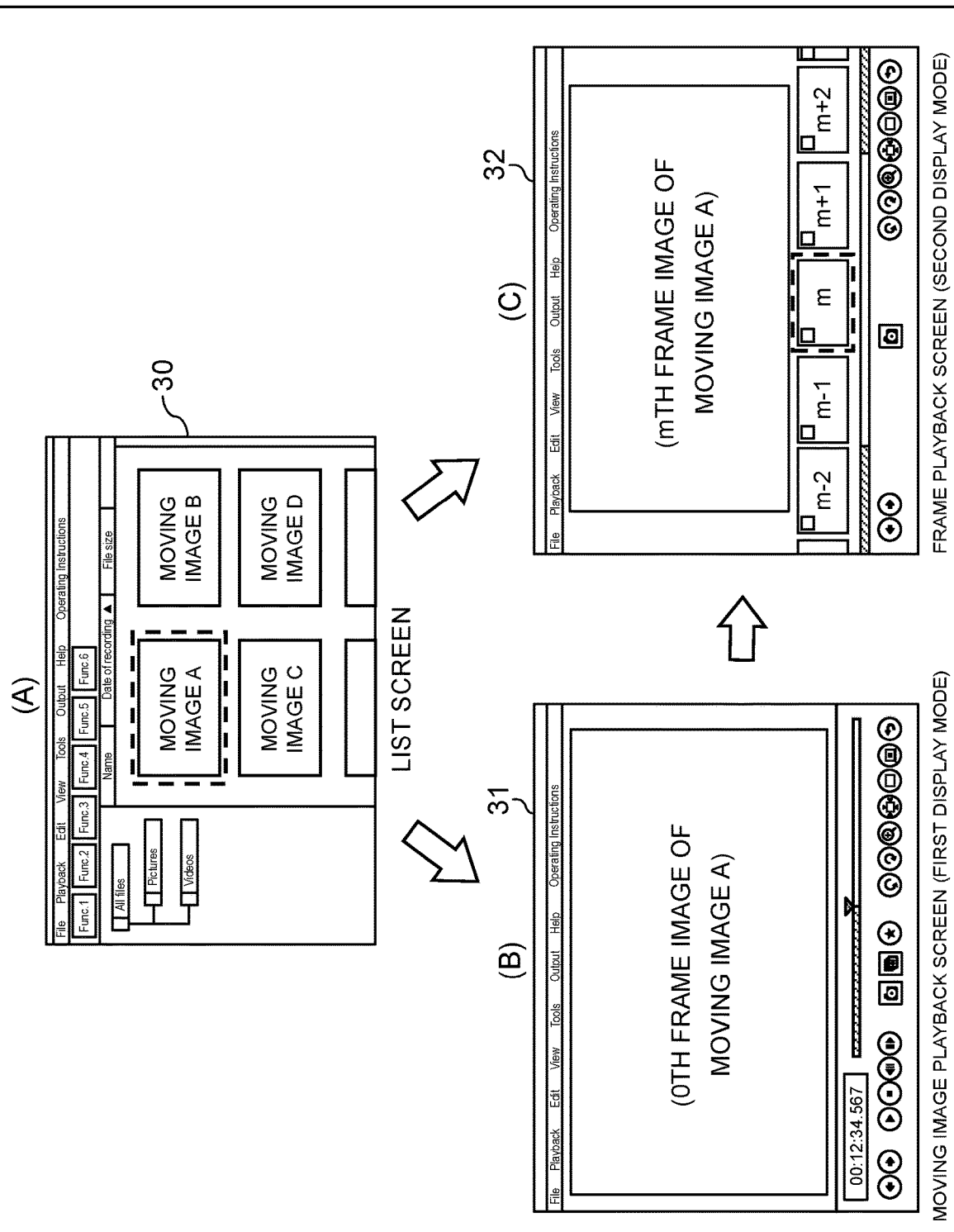
FIG. 3 is a view for explaining an operation screen for generating still image data from moving image data.

FIG. 3 is a view for explaining an operation screen displayed on display unit 13 in information processing apparatus 10 when still image data is generated from moving image data.

Part (A) of FIG. 3 shows an example of list screen 30 for allowing a user to select a moving image. List screen 30 corresponds to a moving image list screen according to the present disclosure. List screen 30 displays thumbnail images of a plurality of moving image data stored in recorder 17. When one thumbnail image is designated on list screen 30, one moving image is selected from a plurality of moving images. Part (B) of FIG. 3 shows an example of moving image playback screen 31 for playing back one moving image selected on list screen 30. Part (C) of FIG. 3 shows an example of frame playback screen 32 for playing back a frame image of a moving image selected on list screen 30. Frame playback screen 32 displays thumbnail images 55a of a plurality of frame images, and corresponds to a thumbnail screen in the present disclosure.

Figure 4:
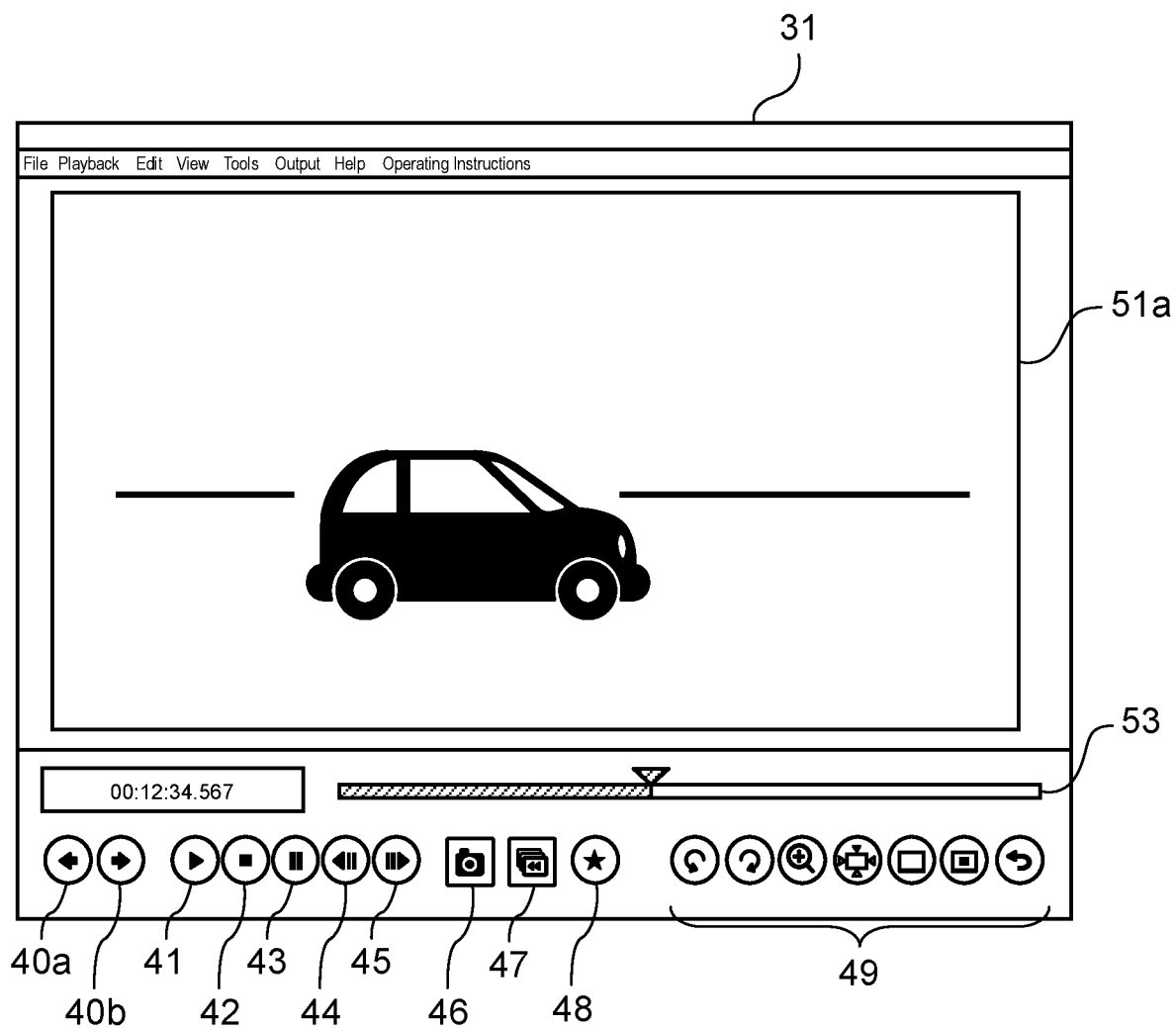
FIG. 4 is a view for explaining an example of a moving image playback screen displayed in a first display mode.

FIG. 4 is an enlarged view of moving image playback screen 31 shown in part (B) of FIG. 3. Moving image playback screen 31 is a screen for playing back a moving image selected on list screen 30. Moving image playback screen 31 includes display area 51a for displaying moving images or frame images and progress bar 53 indicating a progress of moving image playback. In addition, moving image playback screen 31 includes frame advance buttons 40a, 40b, playback button 41, stop button 42, pause button 43, rewind button 44, fast-forward button 45, still image generation button 46, frame playback button 47, and other operation buttons 49. Other operation buttons 49 include buttons for performing operations such as image rotation, image enlargement and reduction, full-screen display, and screen display exit.

Figure 5:
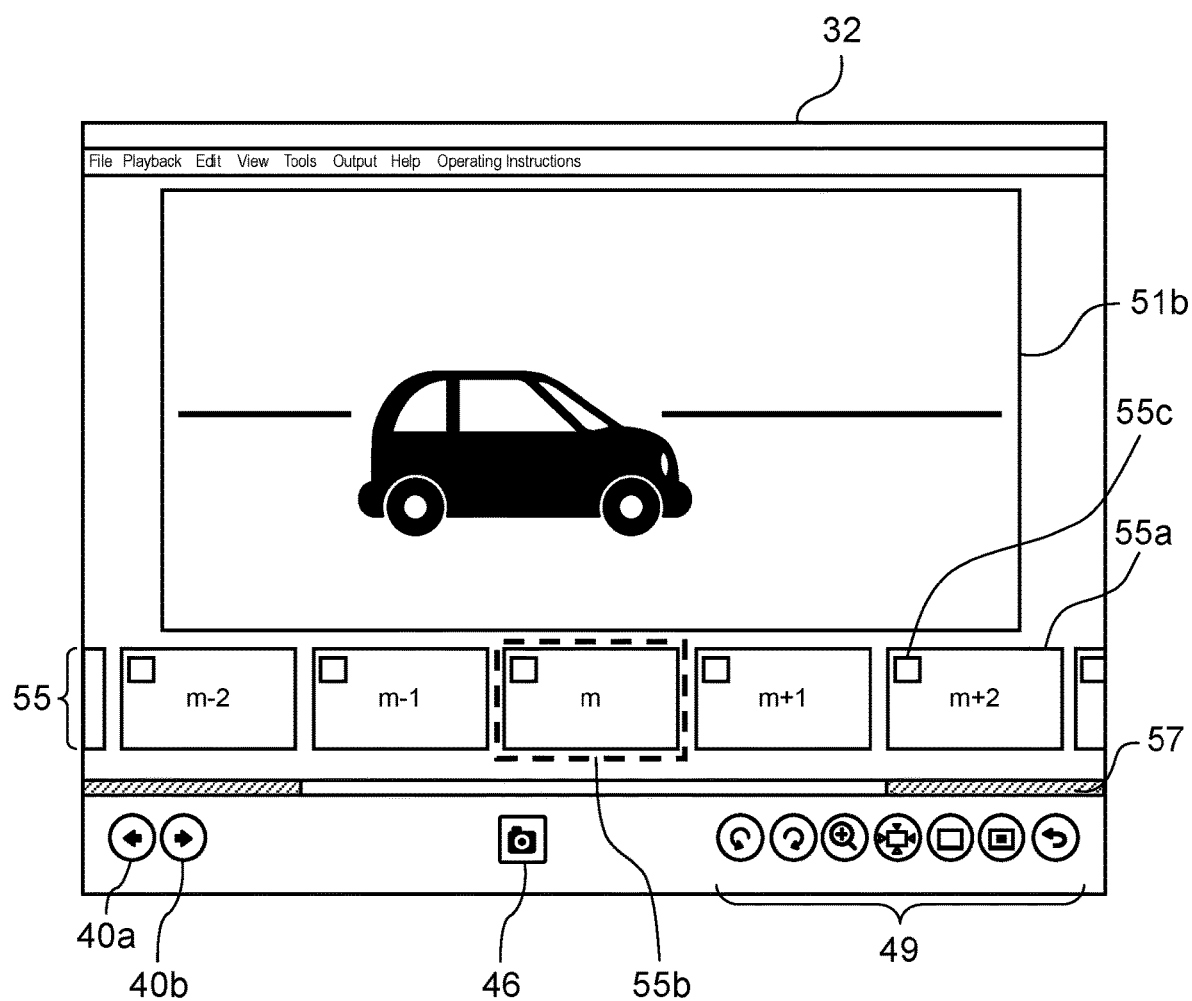
FIG. 5 is a view for explaining an example of a frame playback screen displayed in a second display mode.

FIG. 5 is an enlarged view of frame playback screen 32 shown in part (C) of FIG. 3. Frame playback screen 32 plays back a frame image of a moving image which is selected on list screen 30. Frame playback screen 32 includes display area 51b and thumbnail areas 55. Display area 51b is an area for displaying a selected frame image. Thumbnail areas 55 are areas for displaying the plurality of thumbnail images 55a to allow a user to select an image to be displayed in display area 51b. Note that all images (frame images) to be displayed in display area 51b and thumbnail areas 55 are those generated based on frame image data. Data of a frame image (frame image data) to be displayed in display area 51b and data of frame images (frame image data) to be displayed in thumbnail areas 55 each are generated by decoding still image data compressed in a JPEG format or the like. Frame playback screen 32 includes frame advance buttons 40a, 40b, still image generation button 46, and other operation buttons 49. Frame playback screen 32 also includes scroll bar 57 for scrolling thumbnail images displayed in thumbnail areas 55.

On frame playback screen 32, a user can shift (frame advancing) a frame image displayed in display area 51b forward and backward frame by frame with frame advance buttons 40a, 40b. Thumbnail areas 55 display thumbnail images 55a corresponding to the respective frame images. Thumbnail images 55a displayed in thumbnail areas 55 are switched by scrolling in the horizontal direction. That is, the user can scroll thumbnail images displayed in thumbnail areas 55 by laterally moving scroll bar 57.

When the user selects one thumbnail image 55a in thumbnail area 55, a frame image corresponding to selected thumbnail image 55a is displayed in display area 51b. Frame 55b corresponding to the selected thumbnail image is displayed. Each thumbnail image 55a has checkbox 55c. The user can designate a frame image to be extracted from a moving image by checking checkbox 55c.

[1-2-2. Screen Transition]

Transition of these operation screens (list screen 30, moving image playback screen 31, and frame playback screen 32) will be described by referring back to FIG. 3. When the still image generation application is activated, information processing apparatus 10 displays list screen 30 first. List screen 30 displays a list of moving image data (a list of thumbnail images) recorded in recorder 17 of information processing apparatus 10. When the user executes a predetermined operation on list screen 30, information processing apparatus 10 makes transition to a first display mode or second display mode (to be described later), and displays moving image playback screen 31 or frame playback screen 32. When the user selects and clicks a thumbnail image of one moving image on list screen 30, the apparatus makes transition to the first display mode and displays moving image playback screen 31. In addition, when the user designates a thumbnail image of one moving image on list screen 30 (moving image list screen) and selects the second display mode on a displayed menu by right clicking, the apparatus makes transition to the second display mode and displays frame playback screen 32. Note that this exemplary embodiment will exemplify an application of the arrangement of the still image generating apparatus according to the present disclosure to the second display mode.

Moving image playback screen 31 is a screen for playing back a moving image selected on list screen 30. When pause button 43 shown in FIG. 4 is pressed on screen 31 during moving image playback, the moving image playback is paused. A paused frame image is then displayed in display area 51a in FIG. 4. In this state, the user can switch between frame images to be displayed in display area 51a by operating frame advance buttons 40a, 40b.

When the user presses still image generation button 46 while a desired frame image is displayed in display area 51a, image data is generated concerning the frame image during display.

On the other hand, when the user operates frame playback button 47 while a desired frame image is displayed in display area 51a, information processing apparatus 10 makes transition to the second display mode and displays frame playback screen 32.

Frame playback screen 32 is a screen for playing back frame images constituting a moving image in units of frames. The user can switch between frame images (that is, frame positions) to be displayed in display area 51b by operating frame advance buttons 40a, 40b on frame playback screen 32 in FIG. 5. When the user operates still image generation button 46 while checkbox 55c of at least one thumbnail image 55a is checked, information processing apparatus 10 generates image data concerning a frame image corresponding to checked thumbnail image 55a.

Figure 6:
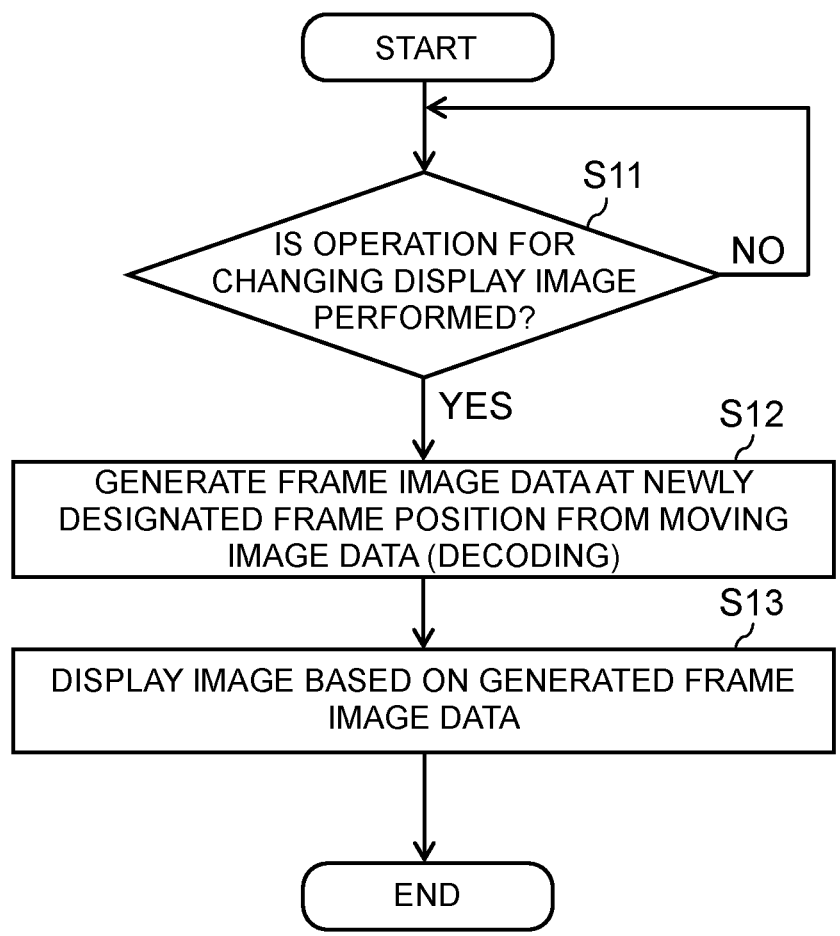
FIG. 6 is a flowchart showing display processing to be performed when a frame advance operation is executed on the moving image playback screen in the first display mode.

FIG. 6 is a flowchart showing display processing when the user executes a frame advance operation on moving image playback screen 31 in the first display mode. When the user operates frame advance buttons 40a, 40b while moving image playback is paused on moving image playback screen 31, images to be displayed in display area 51a on moving image playback screen 31 are switched. An operation at this time will be described with reference to the flowchart of FIG. 6.

When the user executes a frame advance operation (YES in step S11), controller 11 generates data of a frame image (frame image data) newly designated by the frame advance operation by decoding moving image data (step S12).

More specifically, controller 11 determines a frame advance operation direction based on a type of button, of frame advance buttons 40a, 40b in FIG. 4, which has been operated, and specifies a position of a frame image (frame position) to be newly displayed. Assume that a plurality of frame image data constituting moving image data are arranged in accordance with a predetermined coding scheme (for example, an H.265 coding scheme). Frame positions correspond to an order in which the respective frame images are arranged. A frame image to be newly displayed is therefore a frame image arranged immediately preceding or succeeding a current frame image displayed in display area 51a before a frame advance operation.

Figure 7:
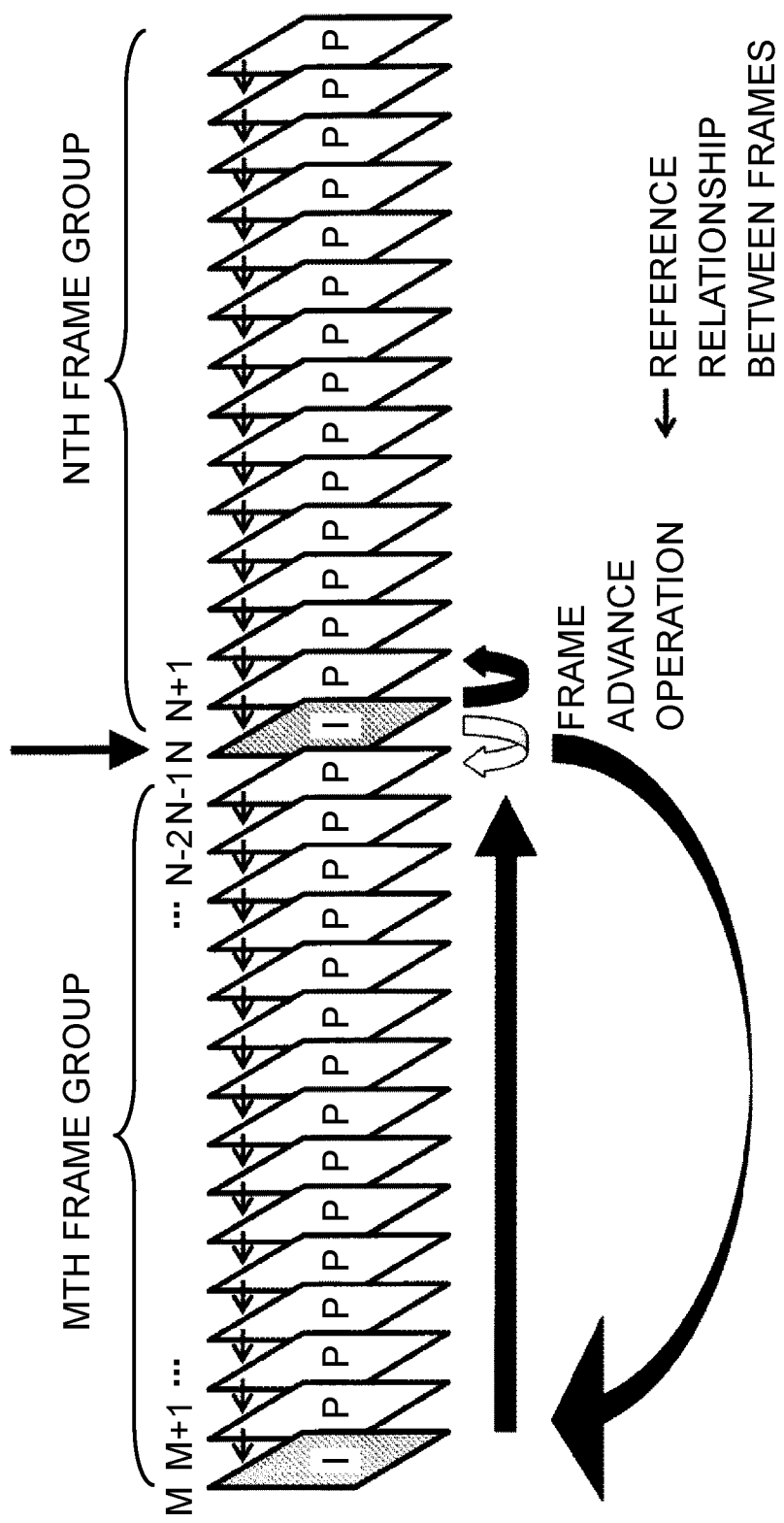
FIG. 7 is a view for explaining a problem that can occur at the time of a frame advance operation on the operation screen.

In this case, when frame image data is generated from moving image data, a frame image corresponding to one frame needs to be decoded. Assume that, as shown in FIG. 7, an Nth frame image of a plurality of frame images constituting a moving image is currently displayed in display area 51a on moving image playback screen 31. An operation to be performed when frame advance button 40b is operated in this state will be described. Although this exemplary embodiment will exemplify a case in which moving image data coded on the basis of the H.265 coding scheme is constituted by only an I-picture and P-pictures, for the sake of descriptive convenience, moving image data may be constituted by an I-picture, B-pictures, and P-pictures. A plurality of frame images constituting a moving image are segmented into a plurality of frame image groups to be identified for each predetermined frame count. A frame image group corresponds to a so-called group of pictures (GOP). In each frame image group, a plurality of frame images are arranged in accordance with a reference relationship.

For example, FIG. 7 shows an Mth frame image group and an Nth frame image group. The Mth frame image group and the Nth frame image group each include a predetermined number of frame images. An I-picture is a first frame image of each frame image group. P-pictures are frame images other than the first frame image. When frame advance button 40b is operated while the Nth frame image is displayed in display area 51a, an image to be displayed in display area 51a is switched to an image of an (N+1)th frame immediately succeeding the Nth frame. At this time, decoding is performed by using a P-picture of the (N+1)th frame and an I-picture of the Nth frame to which the P-picture of the (N+1)th frame refers, and therefore frame image data of the (N+1)th frame is generated. That is, in order to generate the frame image data of the (N+1)th frame, an Nth frame group is specified as a frame group to which the (N+1)th frame belongs. The moving image data is then decoded by referring to data of a plurality of frame images (two frame images in a case shown in FIG. 7), of all the frame images belonging to the Nth frame group, which range from the first frame image (I-picture) of the Nth frame group to the frame image of the (N+1)th frame.

Meanwhile, an operation to be performed when frame advance button 40a is operated while the Nth frame image is displayed in display area 51a on moving image playback screen 31 will be described. In this case, an image to be displayed in display area 51a is switched to an image of an (N−1)th frame immediately preceding the Nth frame. At this time, frame image data of the (N−1)th frame is generated by executing decoding using a P-picture of the (N−1)th frame, an I-picture of an Mth frame, and P-pictures ranging from an (M+1)th frame to an (N−2)th frame. The P-picture of the (N−1)th frame refers to the I-picture of the Mth frame and the P-pictures ranging from the (M+1)th frame to the (N−2)th frame. That is, in order to generate the frame image data of the (N−1)th frame, an Mth frame group is specified as a frame group to which the (N−1)th frame belongs. The moving image data is then decoded by referring to a plurality of frame images, of all the frame images belonging to the Mth frame group, which range from the first frame image (I-picture) of the Mth frame group to the frame image of the (N−1)th frame.

When frame image data is generated, controller 11 displays a frame image based on the generated frame image data in display area 51a (step S13).

In this manner, on moving image playback screen 31 according to this exemplary embodiment, every time frame advance button 40a, 40b is operated, moving image data is decoded to generate frame image data concerning an image at a newly designated frame position.

For this reason, when moving image data has a high resolution or hardware that performs decoding has low performance, it takes much time for decoding. When the user executes a frame advance operation on moving image playback screen 31, it takes much time to switch between images, thus degrading user's convenience.

In order to solve this problem, when a frame image to be extracted from a moving image is selected from a plurality of frame images, information processing apparatus 10 according to this exemplary embodiment generates still image data respectively corresponding to several frame images including the selected frame image by decoding the moving image data. The several frame images include, for example, the selected frame image and frame images having a reference relationship with the selected frame image. The generated still image data are temporarily stored in a buffer area of recorder 17. A capacity of still image data can be set to be smaller than that of frame image data, and hence, recorder 17 can record a large number of still image data. In addition, when frame image data is generated by decoding still image data, a processing speed can be increased, as compared with when frame image data is generated by decoding moving image data. That is, when frame image data is generated by decoding moving image data, it takes much time to perform processing, because the moving image data is decoded by using all frame image data having a reference relationship, as in step S12 in FIG. 6. In contrast to this, according to this exemplary embodiment, still image data of frame images having a reference relationship are recorded in advance, so that a frame image can be generated based on the still image data.

A case in which extraction from a moving image is executed by converting each of a plurality of frame image data having a reference relationship into still image data in advance as described above will be described below with reference to the second display mode according to this exemplary embodiment.

In the second display mode, an operation screen for performing an operation for selecting a still image to be extracted from a moving image is displayed as in the first display mode. In the first display mode, moving image playback screen 31 is displayed, whereas in the second display mode, frame playback screen 32 is displayed. In addition, in the second display mode, a frame image and thumbnail images of frame images are displayed.

In addition, in the second display mode, when the user executes a frame advance operation on frame playback screen 32, controller 11 reads out still image data at a newly designated frame position from recorder 17, and decodes frame image data. Controller 11 then displays a frame image based on the frame image data in display area 51b in FIG. 5. As described above, in the second display mode, because still image data (JPEG format) decoded in advance are prepared, there is no need to decode moving image data every time the user executes a frame advance operation. For this reason, when the user executes a frame advance operation on frame playback screen 32, it is possible to quickly switch between images to be displayed in display area 51b, thereby improving user's convenience.

Figure 8:
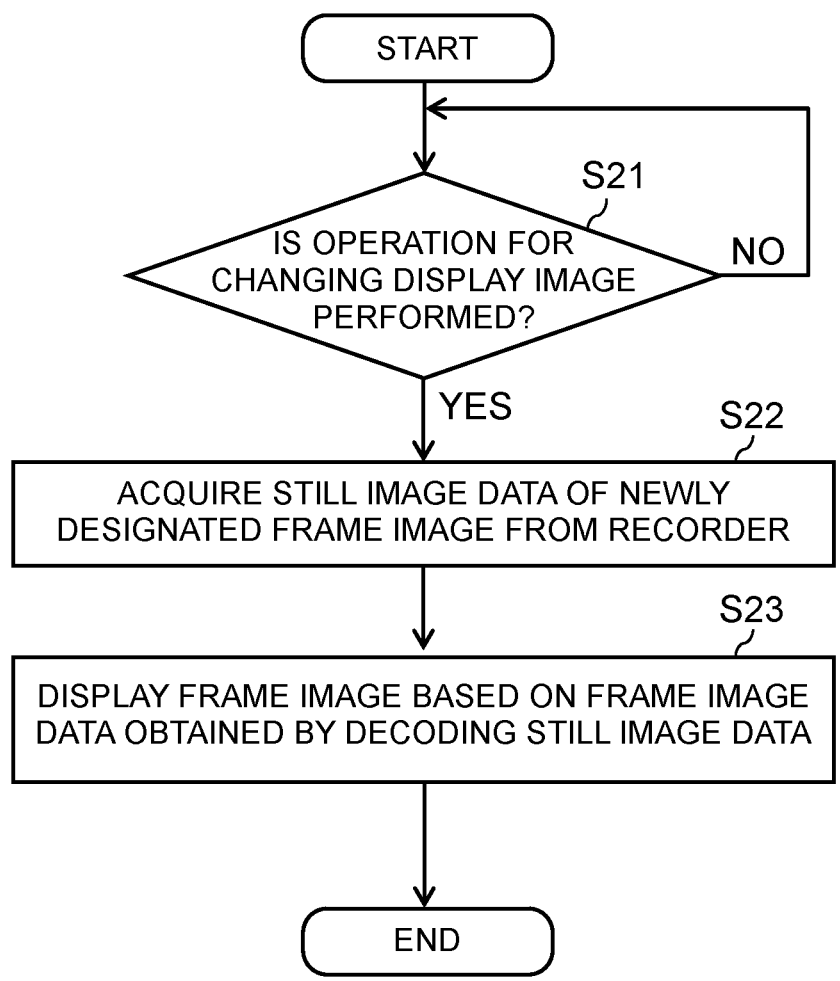
FIG. 8 is a flowchart showing display processing to be performed when a frame advance operation is performed on the frame playback screen in the second display mode.

FIG. 8 is a flowchart showing display processing when the user executes an operation for changing a display image (for example, a frame advance operation) on frame playback screen 32 in the second display mode. In the second display mode, if the user executes an operation for changing a display image in display area 51b (YES in step S21), controller 11 reads out still image data of a newly designated frame image from recorder 17 (step S22). For example, the user can switch between images to be displayed in display area 51b frame by frame by operating frame advance buttons 40a, 40b. In addition, the user can designate desired thumbnail image 55a by moving frame 55b. An image corresponding to designated thumbnail image 55a is then displayed in display area 51b.

When still image data is read out from recorder 17 in step S22, controller 11 generates frame image data by decoding the readout still image data (step S23). Controller 11 then controls display unit 13 to display a frame image based on the generated frame image data in display area 51b on frame playback screen 32 (step S23). As described above, because controller 11 does not decode moving image data every time the user performs an operation for changing an image, it is possible to quickly switch between display images, thereby improving user's convenience.

Figure 9:
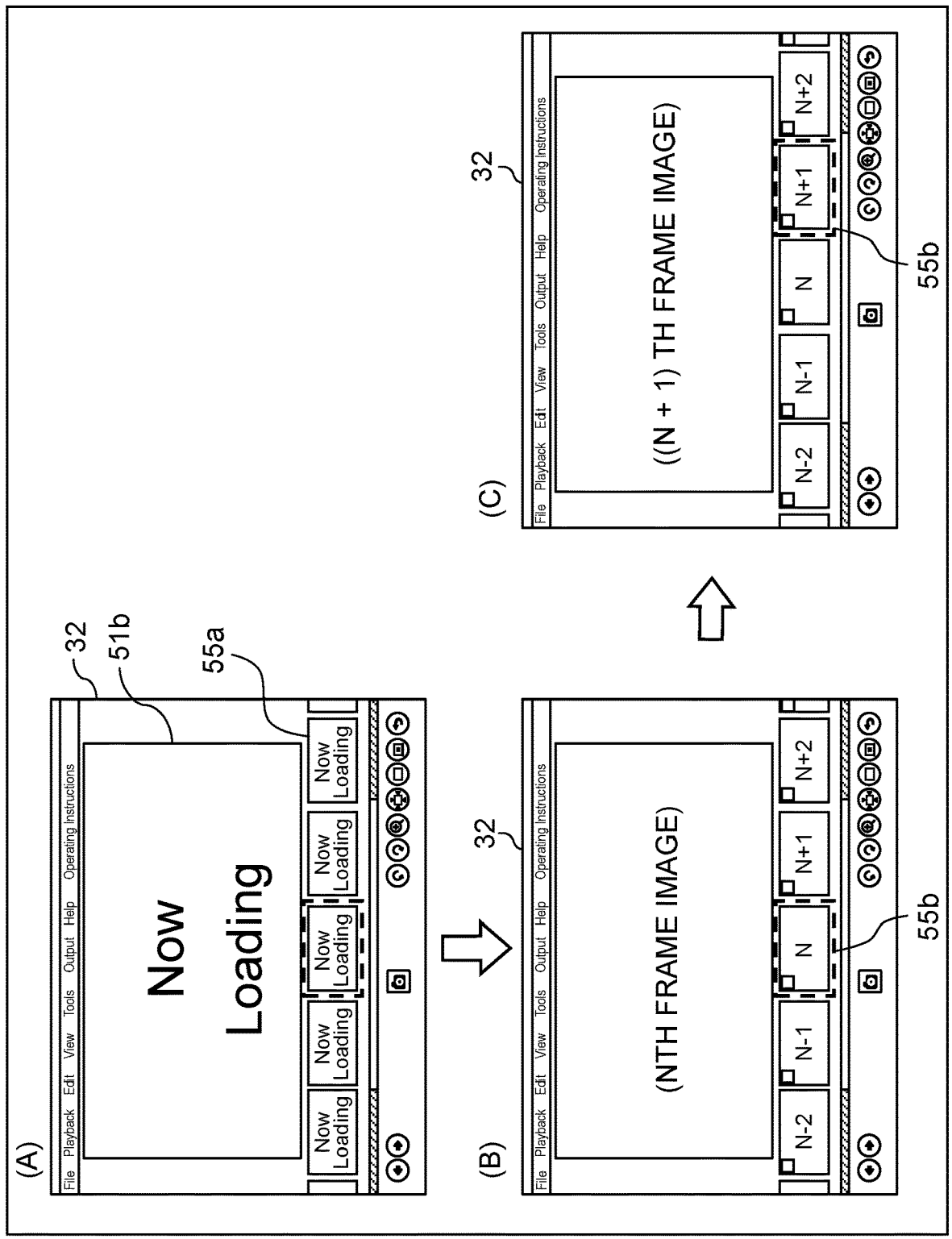
FIG. 9 is a view for explaining a state of a screen immediately after switching to the frame playback screen in the second display mode.

FIG. 9 is a view for explaining screen transition after switching to the second display mode. When the user performs an operation for making transition to the second display mode on list screen 30 shown in FIG. 3 or presses frame playback button 47 on moving image playback screen 31, the display mode on display unit 13 is switched to the second display mode to display frame playback screen 32.

When the current display mode is switched to the second display mode, decoding is started with respect to a predetermined frame image of all frame images constituting a moving image. Because no still image corresponding to each frame image exists until decoding with respect to each frame image is completed, images indicating "Now Loading" are set (displayed) in display area 51b and thumbnail areas (thumbnail areas 55 in FIG. 5), as indicated by part (A) of FIG. 9. Subsequently, when decoding is completed, the still image data is decoded into frame image data. Concerning a frame image for which the frame image data has been generated, the frame image based on the respective frame image data is displayed in display area 51b or thumbnail area 55. Note that the still image data includes still image data corresponding to a frame image displayed in display area 51b and still image data corresponding to a thumbnail image displayed in thumbnail area 55. That is, two still image data are generated for display area 51b as a main area and thumbnail area 55 for each frame image.

When decoding is completed with respect to all predetermined frame images, an image indicating "Now Loading" is replaced with a frame image, as indicated by part (B) of FIG. 9. Referring to part (B) of FIG. 9, thumbnail images concerning an (N−2)th frame to an (N+2)th frame are displayed in thumbnail areas, and the thumbnail image of an Nth frame is selected (designated) by frame 55b. With this operation, an image of the selected (designated) Nth frame is displayed in display area 51b.

When the designation of the frame position is further changed in a state indicated by part (B) of FIG. 9, an image to be displayed in display area 51b is switched to an image at the newly designated frame position. As indicated by part (C) of FIG. 9, when an image of the (N+1)th frame is newly selected, an image of the newly selected (designated) (N+1) th frame is displayed in display area 51b.

[1-2-3. Acquisition Processing of Frame Image Data in Second Display Mode]

Figure 10:
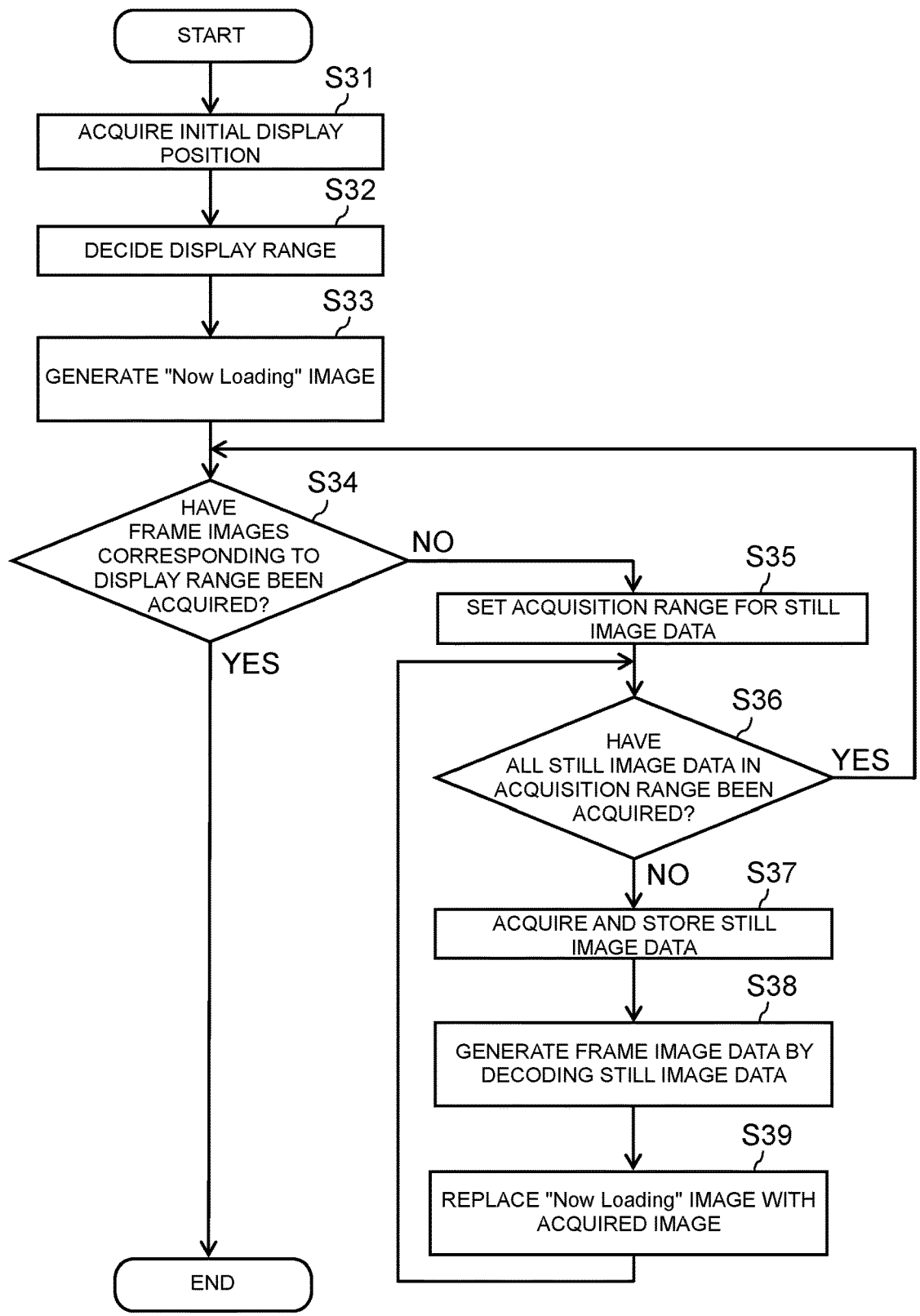
FIG. 10 is a flowchart showing acquisition processing of frame image data in the second display mode.

Acquisition processing of frame image data in the second display mode will be described in detail below. FIG. 10 is a flowchart showing acquisition processing of frame image data in the second display mode.

Controller 11 acquires a frame position of a frame image to be displayed first in display area 51b on frame playback screen 32 in FIG. 5 (step S31). More specifically, when transition is made from list screen 30 in FIG. 3 to frame playback screen 32, a frame position of a first frame image, of a plurality of frame images constituting a moving image, which is designated on list screen 30 is set as an initial display position. In contrast, when transition is made from moving image playback screen 31 to frame playback screen 32, a frame position of a frame image that has been displayed in display area 51a on moving image playback screen 31 is set as an initial display position. A manner of setting an initial display position is not limited to this, and another manner of setting may be used. In addition, these settings may be changed automatically or in accordance with a user's operation.

Controller 11 then decides a display range (step S32). The display range indicates a range of frame images to be displayed which are quickly switched on frame playback screen 32. In this case, the display range corresponds to an area including frame positions of a plurality of frame images. More specifically, the user can set a time (display time) required to display a frame image on frame playback screen 32. Controller 11 sets, as a display time, a shorter one of a display time (for example, 5 sec) set by the user and a playback time of a moving image. Controller 11 sets, with reference to an initial display position, a display range that can be displayed in the set display time. The display range includes a frame image group (GOP) including at least a frame image at an initial display position.

After deciding a display range, controller 11 generates images indicating "Now Loading" (hereinafter referred to as "Now Loading" images) in display area 51b and thumbnail areas 55 by a frame image count (hereinafter referred to as a "display frame count") corresponding to the display range (step S33).

Subsequently, controller 11 determines whether frame images corresponding to the display range are acquired (step S34). That is, controller 11 determines whether data of frame images replacing the "Now Loading" images have been acquired.

If frame image data corresponding to the display range have not been acquired (NO in step S34), controller 11 sets an acquisition range for still image data corresponding to frame image data which have not been acquired (step S35). The acquisition range for still image data corresponds to the display range, and is set for each GOP. A method of deciding an acquisition range for still image data will be described in detail later.

After setting an acquisition range for still image data, controller 11 acquires and saves still image data in the set acquisition range (steps S36 and S37). More specifically, controller 11 generates still image data in the set acquisition range by decoding moving image data, and stores the generated still image data in the buffer area of recorder 17 (step S37).

Controller 11 then reads out the still image data stored in recorder 17, and generates frame image data by decoding the still image data (step S38).

Subsequently, concerning a frame image for which the frame image data has been acquired, a "Now Loading" image is replaced with the frame image based on the frame image data (step S39). If these processes are performed for each frame and still image data of all frame images in the acquisition range are acquired (YES in step S36), controller 11 returns to step S34. Upon acquiring frame image data in the display range (YES in step S34), controller 11 terminates this processing.

Upon determining in step S36 that all the still image data in the acquisition range have been acquired (YES in step S36), and then determining that frame image data corresponding to the display range have not been acquired (NO in step S34), controller 11 sets an acquisition range for next still image data in step S35. The process then shifts to step S36. Subsequently, the above processing is repeated until frame image data corresponding to the display range are acquired (steps S34 to S39).

[1-2-4. Decision of Acquisition Range for Still Image Data]

A method of deciding an acquisition range for still image data in step S35 in FIG. 10 will be described. As described above, an acquisition range for still image data is set for each GOP. Accordingly, in step S35, for example, one GOP is set as an acquisition range.

In a first processing loop of steps S35 to S39, controller 11 decides a GOP (hereinafter referred to as a first GOP) including a frame position set as an initial display position as an acquisition range for still image data. If still image data corresponding to the display range have not been acquired in the first processing loop (steps S35 to S39) (NO in step S34 for the second time), a second processing loop is executed. In step S35 for the second time, controller 11 decides, as a next acquisition range, that GOP, of a GOP (hereinafter referred to as a second GOP) immediately preceding the first GOP and a GOP (hereinafter referred to as a third GOP) immediately succeeding the first GOP, which is closer to the initial display position. That is, when the initial display position is close to the second GOP adjacent to the first GOP on the front side, controller 11 decides the second GOP as an acquisition range for frame images. Alternatively, when the initial display position is close to the third GOP adjacent to the first GOP on the rear side, controller 11 decides the third GOP as an acquisition range for frame images. Subsequently, until still image data corresponding to the display range are acquired, GOPs that have not been set as acquisition ranges are sequentially determined as acquisition ranges for frame images in ascending order of distance to the frame position set as the initial display position.

Figure 11:
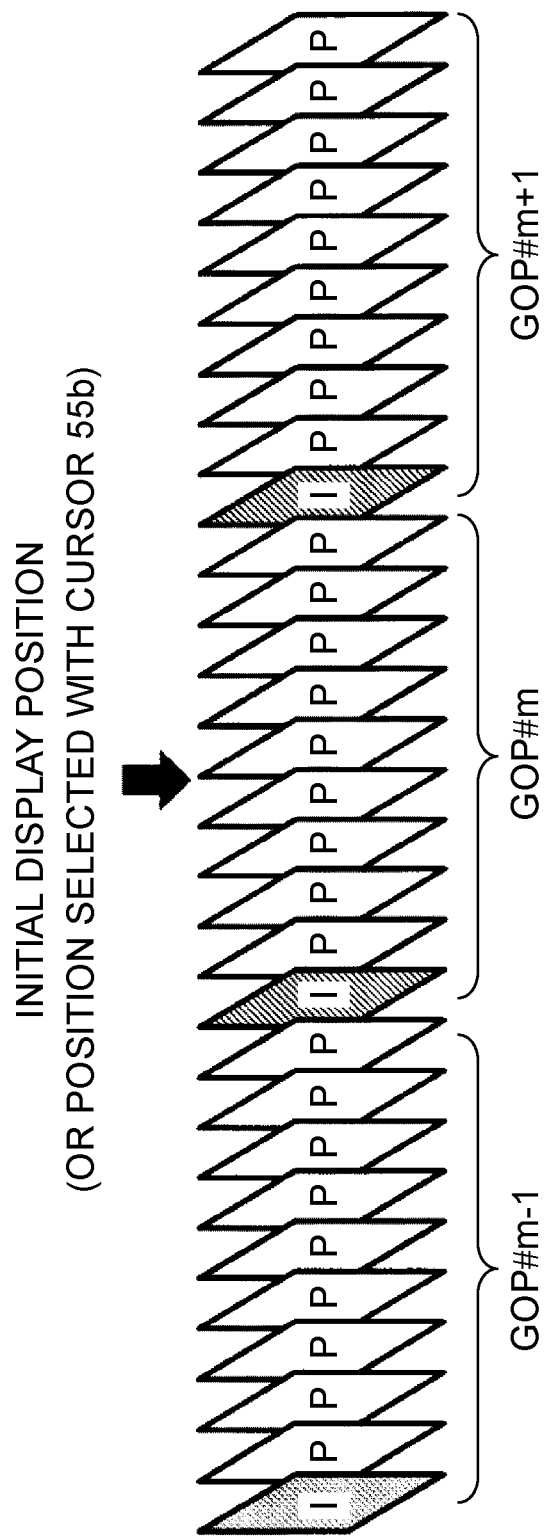
FIG. 11 is a view for explaining an image acquisition range.

This processing will be described in detail with reference to FIG. 11. When a frame image set as an initial display position is included in an mth GOP, controller 11 sets, first of all, the mth GOP as a first acquisition range. When the initial display position is close to an (m−1)th GOP, controller 11 sets the (m−1)th GOP as a next acquisition range. Alternatively, when the initial display position is close to an (m+1)th GOP, controller 11 sets the (m+1)th GOP as an acquisition range. In addition, controller 11 sets, as an acquisition range, that GOP, of an (m−2)th GOP and an (m+2)th GOP, which is closer to the frame image set as the initial display position. Furthermore, controller 11 sets, as an acquisition range, that GOP, of the (m−2)th GOP and the (m+2)th GOP, which is farther from the frame image set as the initial display position. Subsequently, in the same manner as described above, controller 11 alternately sets, as acquisition ranges, GOPs located before and after a GOP as a central GOP that includes the frame image set as the initial display position.

[1-2-5. Change of Still Image Data to be Recorded]

On frame playback screen 32 in FIG. 5, the user can change a frame image to be displayed in display area 51b by selecting thumbnail image 55a in thumbnail area 55 or operating frame advance buttons 40a, 40b. At this time, the user sometimes designates an image at a frame position exceeding a display range set in step S32 in FIG. 10 as a frame image to be displayed in display area 51b. In such a case, controller 11 sets a new display range. Controller 11 then acquires still image data corresponding to the newly set display range.

Figure 12:
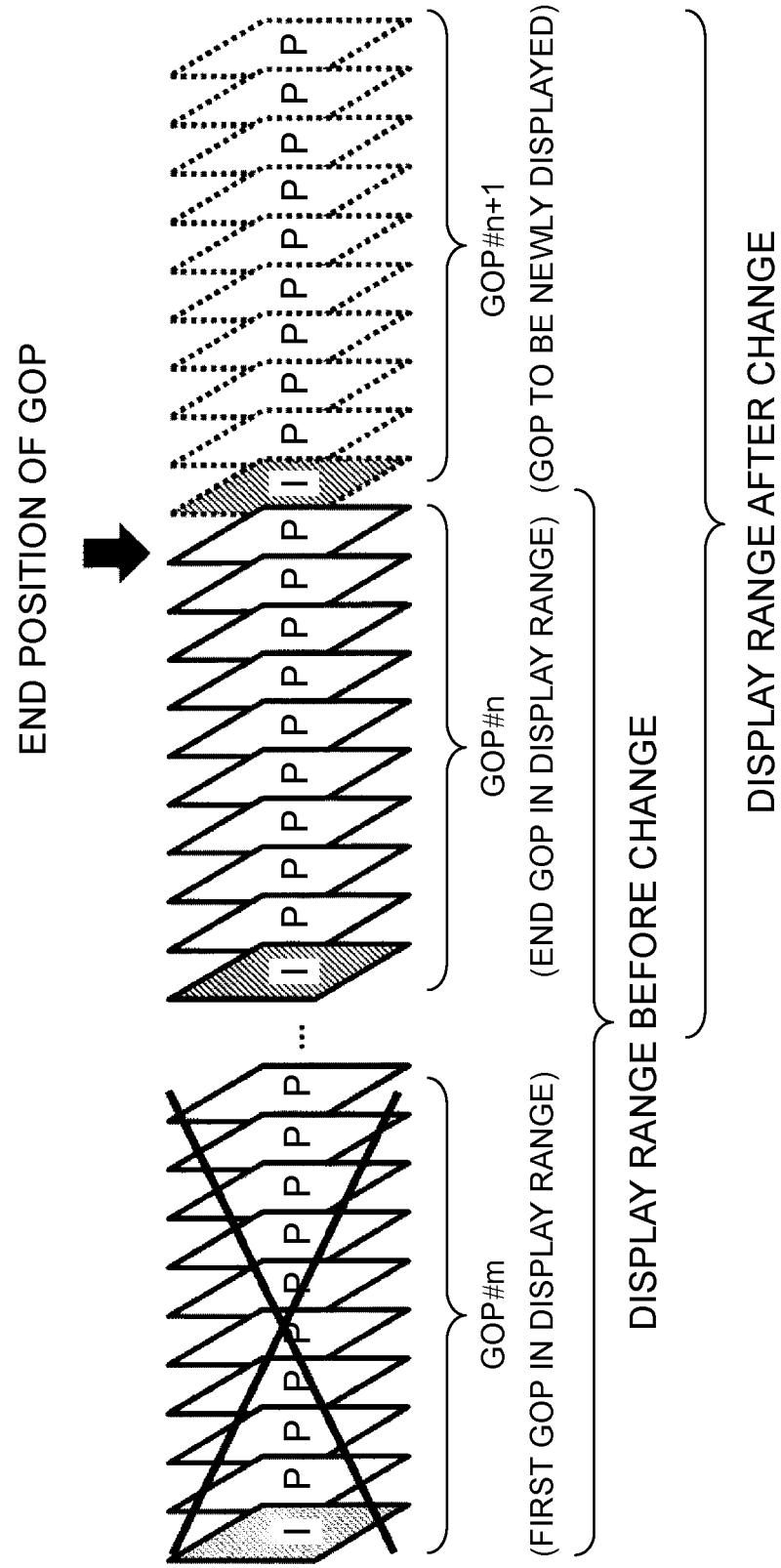
FIG. 12 is a view for explaining a change of a display range when a designated frame exceeds the display range on the screen in the second display mode.

FIG. 12 is a view for explaining the switching of a display range when an image (frame position) designated by the user on frame playback screen 32 exceeds the display range. Assume that in a state before the switching of the display range, as shown in FIG. 12, the display range extends from the mth GOP to the nth GOP, and still image data in these GOPs are stored in the buffer area of recorder 17. Assume that an image of a last frame in the nth GOP is displayed in display area 51b on frame playback screen 32. In this state, when the user presses frame advance button 40b for one-frame advance, an image to be displayed in display area 51b is switched to an image of a first frame in the (n+1)th GOP. However, the first frame in the (n+1)th GOP is located outside the display range, and still image data of frames of the (n+1)th GOP are not stored in the buffer area of recorder 17. Accordingly, when such an operation is executed, controller 11 changes the display range.

More specifically, controller 11 adds the (n+1)th GOP to the display range. In addition, controller 11 deletes the mth GOP from the display range to make the display range have a size falling within a maximum display time. Controller 11 further deletes still image data associated with a first GOP (the mth GOP) in the display range in the buffer area of recorder 17. Thereafter, controller 11 newly acquires still image data of frame images included in the (n+1)th GOP, and stores the data in the buffer area of recorder 17. This constantly maintains the data amount of still image data recorded in the buffer area of recorder 17. As described above, when a frame image (frame position) designated by the user exceeds a display range, still image data in a new range is stored in the buffer area of recorder 17.

Figure 13:
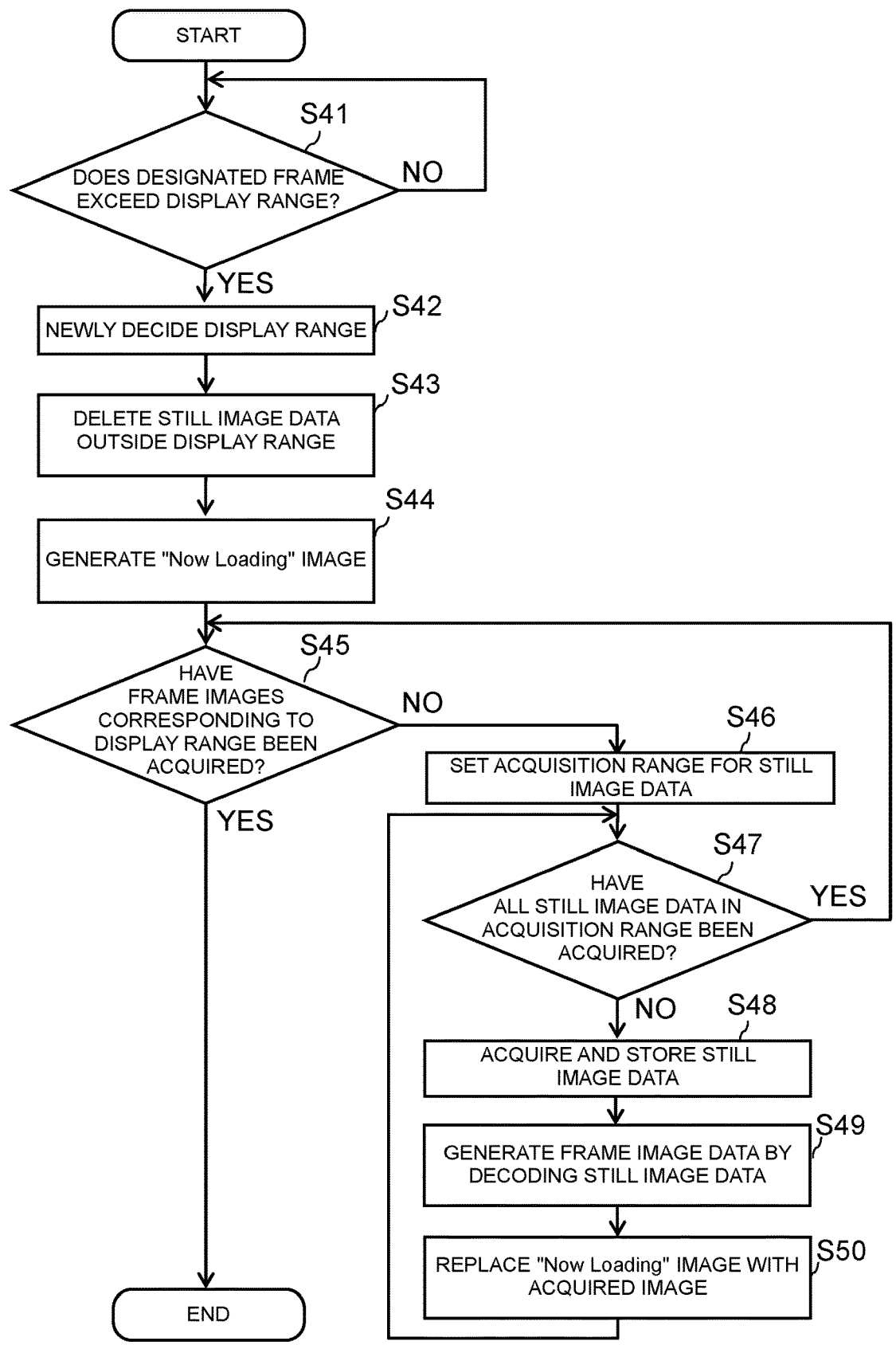
FIG. 13 is a flowchart showing acquisition processing of frame image data when a designated frame position exceeds the display range.

FIG. 13 is a flowchart showing acquisition processing of frame image data when the user designates an image located outside a display range on frame playback screen 32.

If a frame position of an image designated by the user on frame playback screen 32 exceeds a display range (YES in step S41), controller 11 newly decides a display range (step S42). More specifically, controller 11 enlarges the display range so as to include frame images in a direction in which the user wants to change the display range. In addition, controller 11 reduces the display range in a direction opposite to the direction in which the display range is enlarged, so as to make the display range have a size falling within a display range set in advance. In a case in FIG. 12, the (n+1)th GOP is added to the display range, and the mth GOP is deleted from the display range.

After a display range is decided, controller 11 deletes still image data corresponding to frame images outside the display range from the buffer area of recorder 17 (step S43). In the case in FIG. 12, controller 11 deletes still image data from the mth GOP. Controller 11 then generates a "Now Loading" image corresponding to each frame image newly added to the display range (step S44).

Subsequently, controller 11 determines whether frame images corresponding to the display range have been acquired (step S45). That is, controller 11 determines whether all data of frame images (frame image data) to be displayed in place of "Now Loading" images have been acquired. Note that when a display range is newly decided (changed) in step S42, controller 11 determines in step S45 in the first loop that frame images corresponding to the new display range have not acquired (NO in step S45).

Controller 11 then decides an acquisition range for still image data corresponding to frame images with respect to the new display range after the change (step S46). In the case in FIG. 12, controller 11 decides the added (n+1)th GOP as an acquisition range.

Controller 11 then advances to step S47. Note that still image data in the new acquisition range have not been acquired in step S47 immediately after the new acquisition range is set in step S46. Accordingly, controller 11 determines NO in step S47.

Controller 11 then generates still image data in the set acquisition range for frame images by decoding moving image data. Controller 11 stores the generated still image data in the buffer area of recorder 17 (step S48).

Controller 11 then reads out still image data stored in recorder 17, and generates frame image data by decoding the still image data (step S49). Controller 11 generates frame images based on frame image data and replaces the "Now Loading" images (step S50).

If controller 11 determines, upon returning to step S47, that all still image data in the newly set acquisition range have been acquired (YES in step S47), the process returns to step S45. In contrast to this, if controller 11 determines in step S47 that all still image data in the new acquisition range have not been acquired (NO in step S47), the process advances to step S48 again.

Upon determining that frame image data corresponding to frame images corresponding to the display range have been acquired (YES in step S45) in the case where controller 11 determines in step S47 that all still image data have been acquired (YES in step S47) and the process returns to step S45, controller 11 terminates this processing.

As described above, when the user designates a frame image (frame position) outside an existing display range on frame playback screen 32, information processing apparatus 10 changes the display range, and stores still image data corresponding to the new display range in the buffer area. With this operation, because still image data (JPEG format) in the new display range are stored in advance, screen switching can be smoothly executed, thereby improving user's convenience.

[1-2-6. Saving of Still Image Data]

When the user presses still image generation button 46 on frame playback screen 32 in FIG. 5, still image data (still image file) associated with a frame image selected at the time is saved in an area (folder) in recorder 17 which is designated by the user.

Figure 14:
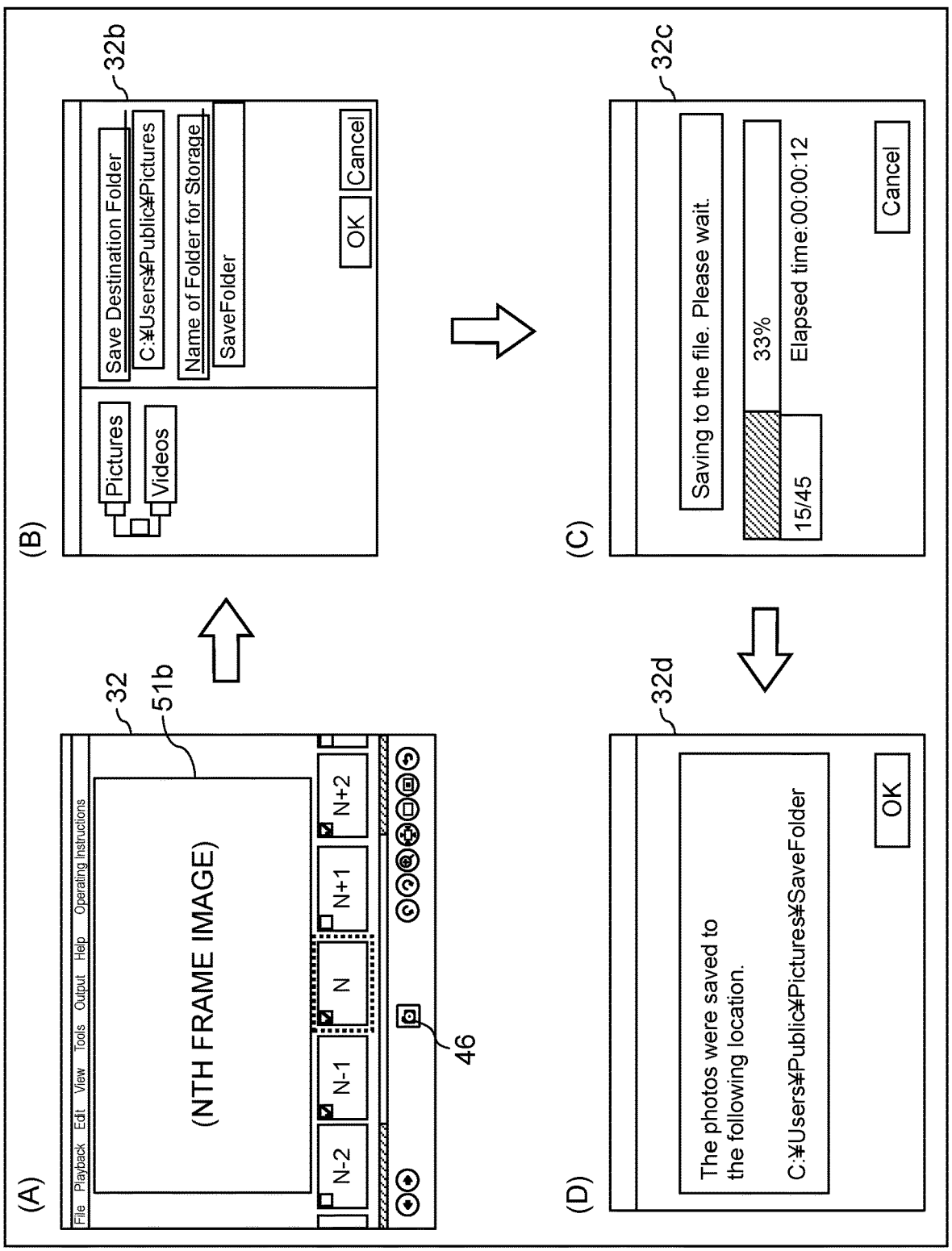
FIG. 14 is a view for explaining an operation at the time of saving still image data.

FIG. 14 is a view for explaining an operation at the time of saving still image data. As shown in part (A) of FIG. 14, when the user presses still image generation button 46 on frame playback screen 32, controller 11 reads out still image data associated with thumbnail images (the (N−1)th, Nth, and (N+2)th frames) whose checkboxes (checkboxes 55c in FIG. 5) are checked from recorder 17 (buffer area), and saves the data in a folder (save area) of recorder 17 which is designated by the user. Accordingly, when the user presses still image generation button 46 on frame playback screen 32, dialog box 32b as shown in part (B) of FIG. 14 is displayed. The user designates a save area and a folder name on dialog box 32b. When the user completes inputting the save area and the folder name, save processing starts, and screen 32c for displaying a progress bar indicating the process of save processing as shown in part (C) of FIG. 14 is displayed. When the save processing is completed, screen 32d indicating the completion of saving of still image data as shown in part (D) of FIG. 14 is displayed.

When the user presses still image generation button 46 on moving image playback screen 31 in FIG. 4, still image data associated with a frame image displayed in display area 51a at that time is generated from the moving image data and saved in that area (folder) of recorder 17 which is designated by the user. In this case as well, screens as indicated by parts (B) to (D) of FIG. 14 are displayed.

[1-3. Advantageous Effects and Others]

(1) As described above, information processing apparatus 10 (an example of a still image generating apparatus) according to this exemplary embodiment generates still image data from moving image data. Moving image data is data that generates a moving image. A moving image includes a plurality of frame images. Information processing apparatus 10 includes recorder 17 that saves data and controller 11 (an example of a control unit).

Recorder 17 is configured to record still image data. When the user selects a specific frame image from a plurality of frame images, controller 11 sets a specific frame image group, and generates still image data respectively corresponding to a plurality of frame images included in the specific frame image group. The specific frame image group includes the specific frame image, of a plurality of frame images constituting the moving image, and other frame images having a reference relationship with the specific frame image. In addition, controller 11 causes recorder 17 to record the still image data. Controller 11 further generates frame image data that generates at least one of the plurality of frame images included in the specific frame image group based on the still image data recorded by recorder 17.

Assume that a conventionally disclosed image processing apparatus generates a high-resolution moving image. In this case, when a display unit is to display a plurality of frame images at once or while switching between the frame images, it sometimes take much processing time. For this reason, when the user selects a desired frame image from a plurality of frame images, there arises a problem that it takes much time. Reasons for this will be described below.

When a frame image is to be displayed by decoding moving image data, frame images having a reference relationship are referred to for the generation of one frame image. This requires much time for decoding. In addition, when a frame image to be displayed is changed, it takes much processing time because moving image data is decoded for each change, which lowers user's convenience. In recent years, in particular, moving images have increased in resolution, and hence the resolution of moving image data has increased (for example, 6K, 8K). In addition, in recent years, new coding schemes such as H.265 (ISO/IEC23008-2 HEVC) have been popularized. High hardware performance is required to decode images coded by such a new coding scheme. For this reason, using low-performance hardware will take much time to decode an image coded by a new coding scheme. On the other hand, a recorder needs to have a large free space to record a plurality of frame image data constituting moving image data.

In contrast to this, when a specific frame image is selected, information processing apparatus 10 according to exemplary embodiment records still image data of other frame images having a reference relationship in advance. Information processing apparatus 10 then generates frame image data based on the still image data. Consequently, when display unit 13 displays a plurality of frame images at once or while switching between the frame images, it is possible to shorten the processing time, thus improving user's convenience.

Note that other frame images having a reference relationship are frame images, at least one frame image, which are referred to when data (frame image data) of the selected specific frame image is generated by decoding.

A specific frame image may be selected by the user or may be automatically selected by controller 11.

In addition, a specific frame image group may be set by controller 11 upon acceptance of selection by the user or automatically set by controller 11.

Furthermore, controller 11 can generate frame image data by decoding still image data.

Moreover, when displaying a plurality of frame images, display unit 13 may display them at once by using corresponding thumbnail images or may switch between them to be displayed one by one by a frame advance operation.

(2) In addition, a program according to the first exemplary embodiment is a program for causing information processing apparatus 10 to generate still image data from moving image data that generates a moving image. The program causes controller 11 (control unit) of information processing apparatus 10 to generate still image data of a plurality of frame image data included in a specific frame image group. The specific frame image group includes a selected specific frame image, of a plurality of frame images included in a moving image, and other frame images having a reference relationship with the specific frame image. The program further causes controller 11 to cause recorder 17 to record generated still image data. In addition, the program causes controller 11 to generate frame image data that generates at least one of a plurality of frame images included in a specific frame image group based on still image data recorded in recorder 17.

This allows the program according to this exemplary embodiment to shorten a processing time when displaying a plurality of frame images on display unit 13 of information processing apparatus 10.

(3) An information recording medium according to this exemplary embodiment is an information recording medium that records the above program in information processing apparatus 10. The information recording medium includes various types of media capable of recording data such as an SD memory card, universal serial bus (USB) memory, DVD, ROM, RAM, and HDD.

This allows the information recording medium according to this exemplary embodiment to store a program that can shorten a processing time when causing display unit 13 of information processing apparatus 10 to display a plurality of frame images.

(4) According to this exemplary embodiment, moving image data is coded based on a coding scheme (for example, H.265) having a predetermined unit of coding. A specific frame image group corresponds to at least one unit based on the unit of coding.

For example, as in this exemplary embodiment, the specific frame image group may be set in units of GOPs and may be at least one GOP.

This allows information processing apparatus 10 according to this exemplary embodiment to record all still image data of a plurality of frame images having a reference relationship in advance. Information processing apparatus 10 then generates frame image data based on the still image data. Consequently, when display unit 13 displays a plurality of frame images, it is possible to further shorten a processing time, thereby improving user's convenience.

(5) In addition, according to this exemplary embodiment, a moving image includes a plurality of frame image groups that are identified so as to correspond to a unit of coding. When a plurality of frame image groups are arranged based on the unit of coding, a specific frame image group includes a first frame image group including a specific frame image, of the plurality of frame image groups, and at least one of a second frame image group immediately preceding the first frame image group and a third frame image group immediately succeeding the first frame image group.

For example, in this exemplary embodiment, when a given GOP includes a specific frame image, the specific frame image group includes at least one of a GOP before the given GOP and a GOP after the given GOP. When selecting one of the preceding and succeeding GOPs, controller 11 may refer to a frame position of the specific frame image to select a GOP closer to the frame position.

This makes it possible for information processing apparatus 10 according to this exemplary embodiment to expand a range for frame images that are possibly selected and record all still image data for which these frame images are referred to. Consequently, when display unit 13 displays a plurality of frame images, it is possible to further shorten a processing time, thereby improving user's convenience.

(6) This exemplary embodiment also includes display unit 13 that displays thumbnail images. When the user selects a specific frame image, display unit 13 displays thumbnail images of a plurality of frame images included in the specific frame image group based on frame image data generated by controller 11.

For example, in this exemplary embodiment, in the second display mode, a specific frame image group is displayed as thumbnail images. With this operation, in the exemplary embodiment, it is possible to shorten a time required to display thumbnail images, thereby improving user's convenience.

(7) In addition, in this exemplary embodiment, when display unit 13 displays thumbnail images, controller 11 controls display unit 13 to display thumbnail images of a first frame image group, of a specific frame image group, before thumbnail images of other frame image groups.

For example, in this exemplary embodiment, when thumbnail images of a plurality of GOPs are displayed and a selected specific frame image belongs to a given GOP of the plurality of GOPs, the GOP to which the specific frame image belongs is displayed first. When all thumbnail images cannot be displayed on one screen, thumbnail images which the user is expected to want to see are initially displayed, which improves user's convenience.

(8) In addition, according to this exemplary embodiment, a specific frame image group is set in accordance with a decoding time designated by the user.

For example, in this exemplary embodiment, the user can set a time (display time) required to display a frame image on frame playback screen 32 in consideration of a time for which the user can stand by until thumbnail images are displayed. Controller 11 sets, as a display time, a shorter one of a maximum display time (for example, 5 sec) set by the user and a playback time of a moving image. The number of frame image groups is then calculated by calculating the number of frame images that can be displayed in this display time. When, for example, the calculated number of frame image groups is two, controller 11 sets, as a specific frame image group, a GOP including a specific frame image and a GOP before or after the specific frame image.

With this operation, in this exemplary embodiment, when display unit 13 displays a plurality of frame images, it is possible to shorten a processing time in accordance with a user's request, thereby improving user's convenience.

(9) In addition, according to this exemplary embodiment, display unit 13 switches between and displays a moving image list screen and a thumbnail screen. The moving image list screen according to the present disclosure is, for example, list screen 30 for moving images as shown in part (A) of FIG. 3. The moving image list screen displays a list of a plurality of moving images. Referring to part (A) of FIG. 3, thumbnail images of a plurality of moving images are displayed in the form of a list. On the other hand, a thumbnail screen according to the present disclosure is, for example, frame playback screen 32 as shown in part (C) of FIG. 3. The thumbnail screen displays thumbnail images of a plurality of frame images included in a specific frame image group based on frame image data generated by controller 11. Furthermore, in the exemplary embodiment, the moving image list screen (list screen 30) includes an operation unit with which the user directly issues an instruction to switch from the moving image list screen to the thumbnail screen (frame playback screen 32). In this exemplary embodiment, the operation unit is a touch panel integrated with display unit 13, but may be other units such as buttons or a dial.

In this exemplary embodiment, when, for example, the user designates a thumbnail image of one moving image on the moving image list screen (list screen 30) and designates the thumbnail screen (frame playback screen 32) on a displayed menu with right clicking, the moving image list screen makes direct transition to the thumbnail screen. That is, the moving image list screen as shown in part (A) of FIG. 3 can make direct transition to the thumbnail screen as shown in part (C) of FIG. 3 without going through moving image playback screen 31 as shown in part (B) of FIG. 3.

In this exemplary embodiment, this allows the user to select a desired frame image more quickly. That is, although it takes some time to execute moving image playback, the processing of executing moving image playback can be omitted in the exemplary embodiment. Note that when the moving image list screen makes direct transition to the thumbnail screen, a specific frame image, that is, a frame image displayed first in the main display area (display area 51b in FIG. 5) on display unit 13, may be set as a frame image at a first frame position. A frame position corresponds to a position of each frame image when a plurality of frame images are arranged based on a predetermined coding scheme.

(10) In addition, in this exemplary embodiment, when a specific frame image is changed, controller 11 changes settings of a specific frame image group (steps S42, S43 in FIG. 13) so as to include the changed specific frame image. That is, in the exemplary embodiment, when the user selects, as a specific frame image, a frame image included in an mth GOP as shown in FIG. 12, an mth GOP and an nth GOP are set as a specific frame image group. However, when the user changes the specific frame image and selects a frame image included in an (n+1)th GOP, the nth GOP and the (n+1)th GOP are set as a specific frame image group.

With this operation, in this exemplary embodiment, even when a frame image designated by the user is changed, a plurality of frame images can be quickly displayed. That is, even when the user greatly changes an image display range, it is possible to continuously implement a quick image switching operation on display area 51b in FIG. 5.

(11) In addition, in this exemplary embodiment, frame playback screen 32 shown in part (C) of FIG. 3 and FIG. 5 has a plurality of thumbnail areas 55 (an example of selection areas). Thumbnail images 55a are respectively displayed in thumbnail areas 55. Thumbnail images 55a are respectively a plurality of frame images constituting a moving image. An image displayed in display area 51b corresponds to a thumbnail image displayed in one of the plurality of thumbnail areas 55. The image displayed in display area 51b allows the user to check the details of the image selected by the user himself.

(12) In addition, in this exemplary embodiment, when the user presses still image generation button 46 with respect to the selected frame image on frame playback screen 32, controller 11 reads out still image data of the corresponding frame image from the buffer area of recorder 17, and saves the data as a still image file in another save area of the recorder (an example of a predetermined recording medium). In this exemplary embodiment, this makes it possible to quickly execute the processing of generating a still image file. Note that in the exemplary embodiment, the data format of a still image file finally generated by being extracted from a moving image is the same as that of still image data that is temporarily saved. However, different data formats may be used.

(13) In addition, this exemplary embodiment discloses the following still image generation application. The still image generation application is a program for causing information processing apparatus 10 to function as a still image generating apparatus.

The still image generation application causes controller 11 of information processing apparatus 10 to execute a function for displaying, as operation screens for selection of a desired frame image from a frame image group constituting moving image data on display unit 13, list screen 30 or moving image playback screen 31 in FIG. 3 (an example of a first operation screen) and frame playback screen 32 (an example of a second operation screen) that makes transition from list screen 30 or moving image playback screen 31 and has display area 51b for displaying a specific frame image of a frame image group constituting a moving image, a function for generating a still image file from moving image data based on selection of a frame image, a function for generating still image data concerning frames in a predetermined range including a specific frame by decoding frame image data constituting moving image data and saving the generated still image data in recorder 17 when list screen 30 or moving image playback screen 31 is switched to frame playback screen 32, and a function for, when a switching operation is performed with respect to an image to be displayed in display area 51b on frame playback screen 32, reading out still image data corresponding to an image after the switching operation from recorder 17 and displaying an image based on the readout still image data in display area 51b.

Other Exemplary Embodiments

The first exemplary embodiment has been described above as an example of the technique disclosed in the present disclosure. However, the technique in the present disclosure is not limited to this and can also be applied to exemplary embodiments having undergone changes, replacements, additions, omissions, and the like as needed. In addition, new exemplary embodiments can be implemented by combining the respective constituent elements described above in the first exemplary embodiment. Accordingly, other embodiments will be exemplified below.

In the above exemplary embodiment, in the second display mode, when a specific frame image is selected, still image data of a specific frame image group is generated. In the first display mode, however, when a specific frame image is selected by pausing a moving image, still image data of a specific frame image group may be generated.

This makes it possible to quickly execute a frame advance operation when the user performs a frame advance operation for a moving image to switch between and display a plurality of frame images.

In addition, in the above exemplary embodiment, moving image data is data generated for the purpose of extracting a still image. This moving image data is special moving image data generated by capturing under image capturing conditions suitable for still images. However, moving image data may be general moving image data generated for the main purpose of generating a moving image. In this case, display unit 13 has the first display mode, but need not have the second display mode. Furthermore, in this case, the arrangement of the still image generating apparatus according to the present disclosure may be applied to moving image playback screen 31 in FIG. 4 which displays in the first display mode. That is, when the user presses pause button 43 on moving image playback screen 31, a frame image is displayed in display area 51*a* in FIG. 4. This frame image corresponds to a specific frame image in the present disclosure. A specific frame image group is then set, which includes the specific frame image and other frame images having a reference relationship with the specific frame image. Controller 11 generates still image data respectively corresponding to a plurality of frame images included in the specific frame image group by decoding moving image data. Controller 11 causes recorder 17 to record the generated still image data. Controller 11 then generates frame image data that generates at least one of the plurality of frame images included in the specific frame image group based on the still image data recorded by recorder 17.

In this case, when the user executes a frame advance operation on moving image playback screen 31, still image data is decoded to generate frame image data. A frame image is then displayed based on this frame image data. This makes it possible to shorten a time required for frame advance display as compared when moving image data is decoded for each frame advance operation.

Although the above exemplary embodiment has exemplified the case in which a final still image file generated from moving image data is recorded in the same recording medium as recorder 17 in which still image data is temporarily stored in the second display mode, the final still image file may be recorded in a recording medium different from recorder 17.

The above exemplary embodiment has exemplified the case in which still image data (JPEG format) of frames, of a plurality of frame images constituting moving image data, which fall within a predetermined range are generated in advance by decoding, and stored in the buffer area of recorder 17 in advance. However, part or all of still image data may be stored in RAM 16 that allows fast storage and retrieval of data. That is, although this exemplary embodiment is configured to temporarily save still image data in recorder 17 in the second display mode, part or all of the still image data may be permanently saved. At this time, a storage amount and a storage destination may be adaptively changed in accordance with a condition such as the capacity of RAM 16 or a still image file size.

According to the above exemplary embodiment, as indicated by, for example, steps S37 and S38 in FIG. 10, controller 11, first of all, acquires still image data of a frame image to be initially displayed, and then records the data in the buffer area of recorder 17 (step S37). Thereafter, controller 11 reads out the recorded still image data and decodes the data into frame image data (step S38). Upon acquiring still image data of a frame image to be initially displayed, controller 11 may directly decode the still image data to generate frame image data concurrently with recording of the still image data.

The above exemplary embodiment has exemplified the case in which still image data (JPEG format) of frames, of a plurality of frame images constituting moving image data, which fall within a predetermined range are generated in advance by decoding, and stored in the buffer area of recorder 17 in advance. However, such data may be generated as still image data in a format different from the JPEG format (for example, a Bitmap format or TIFF format).

In the above exemplary embodiment, image data finally generated when the user presses still image generation button 46 in FIGS. 4 and 5 is data generated by the same scheme as that used to generate still image data (JPEG format) that is temporarily saved. However, this image data may be generated by a scheme different from the scheme used to generate still image data to be temporarily saved.

The above exemplary embodiment has exemplified the method of deciding the acquisition range for still image data in step S35 in FIG. 10, which is a method of alternately setting, as acquisition ranges, GOPs located before and after a GOP as a central GOP that includes a specific frame image set as an initial display position. However, in deciding an acquisition range for frame images, GOPs located before and after a GOP as a central GOP corresponding to a position of frame 55*b* arbitrarily moved by the user may be alternately set as acquisition ranges to preferentially display a frame desired by the user.

The above exemplary embodiment uses moving image data coded by the H.265 coding scheme as moving image data from which still image data is extracted. However, moving image data coded by another coding scheme (for example, H.264/MPEG-4 AVC) may be used.

The above exemplary embodiment has exemplified the information processing apparatus (personal computer (PC)) as a still image generating apparatus. However, the still image generating apparatus is not limited to this. The still image generating apparatus may be a digital camera or smartphone.

According to the above embodiment, the still image generating apparatus (information processing apparatus 10) includes display unit 13. However, information processing apparatus 10 and display unit 13 need not be integral.

As described above, the exemplary embodiment has been described as an example of the technique according to the present disclosure. The attached drawings and detailed descriptions have been provided for this purpose.

Accordingly, the constituent elements described in the attached drawings and detailed descriptions may include not only constituent elements that are essential to solve the problem but also constituent elements that are provided as examples used to exemplify the technique and are not essential to solve the problem. For this reason, the fact that the constituent elements that are not essential are described in the attached drawings and detailed descriptions should not directly be interpreted to indicate that the inessential constituent elements are essential.

The above exemplary embodiment is provided to exemplify the technique according to the present disclosure. Therefore, it is possible to make various changes, replacements, additions, omissions, and the like within the scope of the claims and equivalents thereof.

INDUSTRIAL APPLICABILITY

The still image generating apparatus according to the present disclosure can quickly switch between images that are referred to by the user for image selection on an operation screen that is displayed for generation of still images from moving image data, and can be applied to electronic equipment (a PC, digital camera, smartphone, and the like) that generates still image data from moving image data.

What is claimed is:
1. A still image generating apparatus that generates still image data from moving image data that generates a moving image, the still image generating apparatus comprising:
a recorder configured to record the still image data; and a control unit configured to, when a specific frame image is selected from a plurality of frame images included in the moving image:
(a) set a specific frame image group including the specific frame image and another frame image having a reference relationship with the specific frame image, the plurality of frame images including the specific frame image and said another frame image,
(b) automatically generate the still image data corresponding to each of the plurality of frame images included in the specific frame image group by decoding the moving image data, wherein the still image data corresponding to each of the plurality of frame images is stored in a standardized format,
(c) cause the recorder to record the still image data that is automatically generated,
(d) generate frame image data that generates at least one of the plurality of frame images included in the specific frame image group based on the still image data recorded by the recorder.

2. The still image generating apparatus according to claim 1, wherein
the moving image data is coded based on a coding scheme having a predetermined unit of coding, and
the specific frame image group corresponds to at least one unit based on the unit of coding.

3. The still image generating apparatus according to claim 2, wherein
the moving image includes a plurality of frame image groups, and
when each of the plurality of frame image groups correspond to one unit based on the unit of coding and the plurality of frame image groups are arranged based on the unit of coding, the specific frame image group includes a first frame image group, of the plurality of frame image groups, which includes the specific frame image, and at least one of a second frame image group arranged immediately preceding the first frame image group and a third frame image group immediately succeeding the first frame image group.

4. The still image generating apparatus according to claim 3, further comprising a display unit configured to, when the specific frame image is selected, display thumbnail images of the plurality of frame images included in the specific frame image group based on the frame image data generated by the control unit,
wherein the control unit causes the display unit to display the thumbnail images of the first frame image group of the specific frame image group before the thumbnail images of another frame image group.

5. The still image generating apparatus according to claim 1, further comprising a display unit configured to, when the specific frame image is selected, display thumbnail images of the plurality of frame images included in the specific frame image group based on the frame image data generated by the control unit.

6. The still image generating apparatus according to claim 1, wherein the control unit sets the specific frame image group in accordance with a decoding time designated by a user.

7. The still image generating apparatus according to claim 1, further comprising:
a display unit configured to switch between and display a moving image list screen that displays a list of a plurality of moving images including the moving image and a thumbnail screen that displays thumbnail images of the plurality of frame images included in the specific frame image group based on the frame image data generated by the control unit; and
an operation unit configured to be operated by a user on the moving image list screen to issue an instruction to directly switch from the moving image list screen to the thumbnail screen.

8. The still image generating apparatus according to claim 1, wherein when the specific frame image is changed, the control unit changes a setting of the specific frame image group so as to include the specific frame image that is changed.

9. The still image generating apparatus according to claim 1, wherein
when the controller accepts a specific operation while the display is displaying a first operation screen including a display area for displaying the specific frame image, the controller selects the specific frame image from the plurality of frame images included in the moving image.

10. The still image generating apparatus according to claim 1, wherein
when the controller accepts an operation for shifting from a second operation screen to a first operation screen in a state that the display displays the second operation screen, the second operation screen being able to shift to the first operation screen, the controller selects the specific frame image from the plurality of frame images included in the moving image.

11. A non-transitory computer readable medium that records a program for causing a still image generating apparatus to generate still image data from moving image data that generates a moving image, the moving image including a plurality of frame images, the program causing a control unit of the still image generating apparatus to
automatically generate the still image data corresponding to a specific frame image group including a selected specific frame image and another frame image having a reference relationship with the specific frame image, by decoding the moving image data, the plurality of frame images including the specific frame image and said another frame image, wherein the still image data corresponding to each of the plurality of frame images is stored in a standardized format,
control a recorder of the still image generating apparatus to record the still image data that is automatically generated, and
generate frame image data that generates at least one of the plurality of frame images included in the specific frame image group based on the still image data recorded by the recorder.

* * * * *